(12) United States Patent
White et al.

(10) Patent No.: US 9,686,191 B2
(45) Date of Patent: Jun. 20, 2017

(54) PERFORMING READ OPERATIONS IN NETWORK ON A CHIP ARCHITECTURE

(71) Applicant: KnuEdge Incorporated, San Diego, CA (US)

(72) Inventors: Andy White, Austin, TX (US); Doug Meyer, San Diego, CA (US); Jerry Coffin, San Diego, CA (US)

(73) Assignee: KnuEdge Incorporation, San Diego, CA (US)

(*) Notice: Subject to any disclaimer, the term of this patent is extended or adjusted under 35 U.S.C. 154(b) by 99 days.

(21) Appl. No.: 14/832,654

(22) Filed: Aug. 21, 2015

(65) Prior Publication Data

US 2017/0054635 A1   Feb. 23, 2017

(51) Int. Cl.
*G06F 12/00* (2006.01)
*H04L 12/721* (2013.01)
*G06F 12/109* (2016.01)
*H04L 12/935* (2013.01)
*H04L 12/861* (2013.01)

(52) U.S. Cl.
CPC ............ *H04L 45/72* (2013.01); *G06F 12/109* (2013.01); *H04L 49/3063* (2013.01); *H04L 49/9068* (2013.01); *G06F 2212/657* (2013.01)

(58) Field of Classification Search
CPC . H04L 45/72; H04L 493/063; H04L 49/9068; G06F 12/109; G06F 2212/657
USPC .......................................................... 711/154
See application file for complete search history.

(56) References Cited

U.S. PATENT DOCUMENTS

| 9,170,954 | B2* | 10/2015 | Muff | G06F 12/1027 |
| 9,262,333 | B2* | 2/2016 | Karamcheti | G06F 9/5016 |
| 2016/0062909 | A1* | 3/2016 | Walker | G06F 9/5016 |
| | | | | 711/207 |
| 2016/0217082 | A1* | 7/2016 | Osada | G06F 12/1036 |

* cited by examiner

*Primary Examiner* — Matthew Bradley
(74) *Attorney, Agent, or Firm* — Fish & Richardson P.C.

(57) ABSTRACT

Systems and methods to be used by a processing element from among multiple computing resources of a computing system, where communication between the computing resources is carried out based on network on a chip architecture, to send first data from memory registers of the processing element and second data from memory of the computing system to a destination processing element from among the multiple computing resources, by sending the first data to a memory controller of the memory along with a single appended-read command.

34 Claims, 15 Drawing Sheets

PERFORMING READ OPERATIONS IN NETWORK ON A CHIP ARCHITECTURE

FIELD OF THE DISCLOSURE

The systems, methods and apparatuses described herein relate to reading from memory in a computing system that has a plurality of computing resources, where communication between the computing resources is carried out based on network on a chip architecture.

BACKGROUND

A computing system includes multiple computing resources, at least some of which communicate with each other based on a network on a chip architecture. The computing resources include processing elements (or engines), memories, and the like. Data processed by a processing element can be stored by the processing element, in part remotely, in a memory of the computing system, and, in part locally, in memory registers of the processing element. Often, the processing element combines the items of processed data stored in the memory with the items of processed data stored in the memory registers and then sends the combined processed data items to another processing element for further processing (e.g., as part of a software pipeline).

This is conventionally accomplished by the processing element by performing the following sequence of operations: a first portion of the processed data to be sent to the other processing element is first retrieved from the memory and then placed into memory registers contiguous with the memory registers already holding a second portion of the processed data to be sent to the other processing element. Upon placement of the retrieved first portion of the processed data in the contiguous registers, the processing element transmits the combined processed data to the other processing element for further processing.

SUMMARY

The disclosed technologies are used by a processing element from among multiple computing resources of a computing system, where communication between the computing resources is carried out based on network on a chip architecture, to send first data from memory registers of the processing element and second data from memory of the computing system to a destination processing element from among the multiple computing resources, by sending the first data to a memory controller of the memory along with a single appended-read command. The appended-read command specifies instructions for the memory controller to read the second data, and then to send the combined first data and second data to the destination processing element. Upon receipt of the appended-read command along with the first data, the memory controller reads the second data from the memory, then sends the combined first data and second data to the destination processing element.

In one aspect of the disclosed technologies, a method includes (a) receiving a first packet, at an intermediary computing resource from a first computing resource, where the first computing resource and the intermediary computing resource are among a plurality of computing resources of a computing system. Here, the first packet includes (i) first data that is, at least in part, retrieved from memory associated with the first computing resource, (ii) an address corresponding to memory associated with the intermediary computing resource, and data specifying an instruction to read second data from the address corresponding to memory associated with the intermediary computing resource, and (iii) an address of a destination computing resource from among the plurality of computing resources of the computing system, and data specifying an instruction to write the first data and the second data to memory associated with the destination computing resource. The method further includes (b) reading, by the intermediary computing resource, the second data from the address corresponding to memory associated with the intermediary computing resource; and (c) transmitting a second packet, by the intermediary computing resource to a second computing resource from among the plurality of computing resources of the computing system. Here, the second packet includes (i) the first data and the second data, and (ii) the address of the destination computing resource, and the data specifying the write instruction.

These and other implementations can include one or more of the following features. In some implementations, the second packet does not include the address corresponding to memory associated with the intermediary computing resource.

In some implementations, the second computing resource can be the destination computing resource. Here, the first packet and the second packet each can include an address corresponding to memory associated with the destination computing resource to which the first data and the second data are to be written.

In some implementations, the second computing resource can be a second intermediary computing resource from among the plurality of computing resources of the computing system, and each of the first packet and the second packet further includes (i) an address corresponding to memory associated with the second intermediary computing resource, and data specifying an instruction to read third data from the address corresponding to memory associated with the second intermediary computing resource, and (ii) data specifying an instruction to write the third data to the memory associated with the destination computing resource. Here, the first packet and the second packet each can include an address corresponding to the memory associated with the destination computing resource to which the third data is to be written.

In some implementations, the first computing resource can be an originator computing resource, and all the first data associated with the first computing resource is retrieved from the memory associated with the first computing resource. In some implementations, the first computing resource can be another intermediary computing resource, and the first data associated with the first computing resource is data aggregated by the first computing resource, at least in part, from data received from an originator computing resource with data from the memory associated with the first computing resource.

In some implementations, the method further can include ordering, by the intermediary computing resource in a payload of the second packet, the second data—read by the intermediary computing resource—after the first data—received from the first computing resource. In other implementations, the method further can include ordering, by the intermediary computing resource in a payload of the second packet, the second data—read by the intermediary computing resource—before the first data—received from the first computing resource.

In some implementations, the plurality of computing resources of the computing system comprises one or more controllers of one or more processing devices included in the computing system, a plurality of processing engines of the one or more processing devices, and one or more memory controllers of cluster memory of the one or more processing devices.

In another aspect of the disclosed technologies, a computing apparatus includes one or more hardware processors; and non-transitory computer-readable medium encoding instructions that, when executed by the one or more hardware processors, cause the computing apparatus to perform operations including (a) receive a first packet from a first computing apparatus communicatively coupled with the computing apparatus. Here, the first packet includes (i) first data that is, at least in part, retrieved from memory associated with the first computing apparatus, (ii) an address corresponding to memory associated with the computing apparatus, and data specifying an instruction to read second data from the address corresponding to memory associated with the computing apparatus, and (iii) an address of a destination computing apparatus communicatively coupled with the computing apparatus, and data specifying an instruction to write the first data and the second data to memory associated with the destination computing apparatus. The operations further include (b) read the second data from the address corresponding to memory associated with the computing apparatus, and (c) transmit a second packet, to a second computing apparatus communicatively coupled with the computing apparatus. Here, the second packet includes (i) the first data and the second data, and (ii) the address of the destination computing apparatus, and the data specifying the write instruction.

These and other implementations can include one or more of the following features. In some implementations, the second packet does not include the address corresponding to memory associated with the computing apparatus.

In some implementations, the second computing apparatus can be the destination computing apparatus. For example, the first packet and the second packet each can include an address corresponding to memory associated with the destination computing apparatus to which the first data and the second data are to be written. As another example, each of the first packet and the second packet further can further include (i) an address corresponding to memory associated with the second computing apparatus, and data specifying an instruction to read third data from the address corresponding to memory associated with the second computing apparatus, and (ii) data specifying an instruction to write the third data to the memory associated with the destination computing apparatus. In the latter example, the first packet and the second packet each can include an address corresponding to the memory associated with the destination computing apparatus to which the third data is to be written.

In some implementations, the first computing apparatus can be an originator computing apparatus, and all the first data associated with the first computing apparatus is retrieved from the memory associated with the first computing apparatus. In other implementations, the first data associated with the first computing apparatus can be data aggregated by the first computing apparatus, at least in part, from data received from an originator computing apparatus with data from the memory associated with the first computing resource.

In some implementations, the computing apparatus can be configured either as a controller of a processing device included in a computing system, a processing engine of the processing device, or a memory controller of cluster memory of the processing device.

In yet another aspect of the disclosed technologies, a computing system includes a plurality of computing resources; and memory associated with respective ones of the computing resources. Here, an intermediary computing resource of the plurality of computing resources is communicatively coupled with each of a first computing resource and a second computing resource of the plurality of computing resources. Additionally, the intermediary computing resource is configured to (a) receive a first packet from the first computing resource, where the first packet includes (i) first data that is, at least in part, retrieved from memory associated with the first computing resource, (ii) an address corresponding to memory associated with the intermediary computing resource, and data specifying an instruction to read second data from the address corresponding to memory associated with the intermediary computing resource, and (iii) an address of a destination computing resource from among the plurality of computing resources, and data specifying an instruction to write the first data and the second data to memory associated with the destination computing resource. The intermediary computing resource is configured to (b) read the second data from the address corresponding to memory associated with the intermediary computing resource; and (c) transmit a second packet to the second computing resource, where the second packet includes (i) the first data and the second data, and (ii) the address of the destination computing resource, and the data specifying the write instruction.

These and other implementations can include one or more of the following features. In some implementations, the second packet does not include the address corresponding to memory associated with the intermediary computing resource.

In some implementations, the second computing resource can be the destination computing resource. Here, the first packet and the second packet each can include an address corresponding to memory associated with the destination computing resource to which the first data and the second data are to be written.

In some implementations, the second computing resource can be a second intermediary computing resource, and each of the first packet and the second packet further can include (i) an address corresponding to memory associated with the second intermediary computing resource, and data specifying an instruction to read third data from the address corresponding to memory associated with the second intermediary computing resource, and (ii) data specifying an instruction to write the third data to the memory associated with the destination computing resource. Here, the first packet and the second packet each can include an address corresponding to the memory associated with the destination computing resource to which the third data is to be written.

In some implementations, the first computing resource can be an originator computing resource, and all the first data associated with the first computing resource is retrieved from the memory associated with the first computing resource.

In some implementations, the first computing resource can be another intermediary computing resource that is communicatively coupled with an originator computing resource from among the plurality of computing resources, and the first data associated with the first computing resource is data aggregated by the first computing resource, at least in part, from data received from the originator computing resource with data from the memory associated with the first computing resource.

In some implementations, the plurality of computing resources of the computing system can include one or more controllers of one or more processing devices included in the computing system, a plurality of processing engines of the one or more processing devices, and one or more memory controllers of cluster memory of the one or more processing devices. For example, the first computing resource is a first processing engine of the plurality of processing engines, the intermediary computing resource is one of the one or more memory controllers, and the destination computing resource is a second processing engine of the plurality of processing engines. As another example, the first computing resource is a first processing engine of the plurality of processing engines, the intermediary packet processor is a second processing engine of the plurality of processing engines, and the second packet processor is a third processing engine of the plurality of processing engines. As yet another example, wherein the first computing resource is a processing engine of the plurality of processing engines, the intermediary computing resource is a first one of the one or more memory controllers, and the destination computing resource is a second one of the one or more memory controllers. In some cases, at least one processing device from among the one or more processing devices is implemented as a system on a chip (SoC). In some cases, at least one computing resource of the plurality of computing resources is implemented as a microprocessor, a microcontroller, a field programmable gate array (FPGA) or an application specific integrated circuit (ASIC).

Particular aspects of the disclosed technologies can be implemented so as to realize one or more of the following potential advantages. A conventional sequence of operations—through which a processing element that has first data in its memory registries first reads second data from a memory, then sends the combined first data and second data to a destination processing element—often stalls the processing element while the memory read takes place. The response with the second data from memory can typically be expected soon enough such that little is gained from attempting to execute another task in the interim, but long enough to substantially slow processing, especially if such stalls happen frequently. In contrast, the disclosed technologies enable the processing element to provide to the destination processing element the first data from its own registers combined with the second data from memory by issuing a single appended-read command, without further involvement of the processing element after transmitting the appended-read command along with the first data. In this manner, the disclosed technologies allow the processing element to either save energy by entering a low-power state if it has no more tasks to carry out, or else save time by beginning to process a subsequent task if it does have more tasks to carry out. Note that the processing element does not, however, have to remain active processing the current task while the memory read operation takes place.

Details of one or more implementations of the disclosed technologies are set forth in the accompanying drawings and the description below. Other features, aspects, descriptions and potential advantages will become apparent from the description, the drawings and the claims.

Figure 1A:
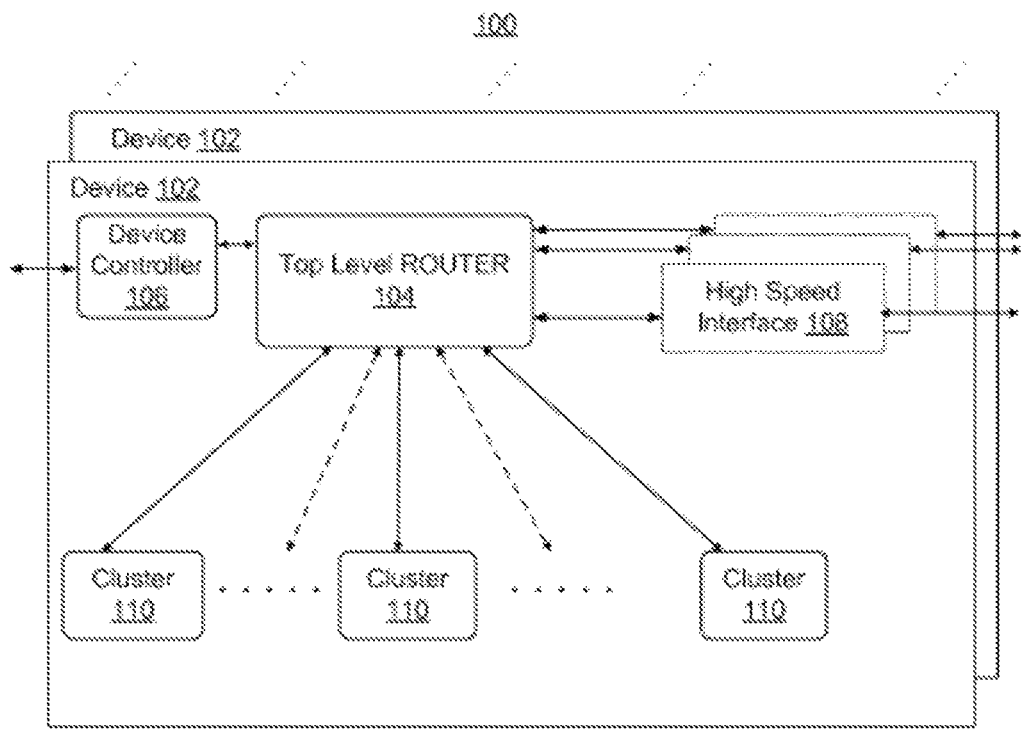
FIG. 1A is a block diagram of an example of a computing system.

Certain illustrative aspects of the systems, apparatuses, and methods according to the disclosed technologies are described herein in connection with the following description and the accompanying figures. These aspects are, however, indicative of but a few of the various ways in which the principles of the disclosed technologies may be employed and the disclosed technologies are intended to include all such aspects and their equivalents. Other advantages and novel features of the disclosed technologies may become apparent from the following detailed description when considered in conjunction with the figures.

DETAILED DESCRIPTION

Technologies are described for performing appended-read operations in network on a chip architecture. In some implementations, an originator computing resource (e.g., a processing element or engine)—from among multiple computing resources of a computing system, at least some of which being integrated in a network on a chip device—sends an appended-read command to an intermediary computing resource (e.g., a memory controller) from among the multiple computing resources. The appended-read command can be sent as an appended-read packet including (i) a specification of a read operation to be performed by the intermediary computing resource; (ii) first data from storage associated with the originator computing resource; (iii) an address of second data in memory associated with the intermediary computing resource; (iv) a length/size of second data; and (v) a specification of a destination computing resource (e.g., another processing element or another memory controller) to which the combined first data and second data is to be sent. Upon receipt of the appended-read command, the intermediary computing resource retrieves the second data from the memory associated with the intermediary computing resource (e.g., from the memory controlled by the memory controller). The first data in the appended-read command is held by the intermediary computing resource until retrieval of second data has been completed. When the retrieval of second data has been completed, the intermediary computing resource combines the second data retrieved from memory with the first data received from the originator computing resource. The intermediary computing resource then transmits the combined first data and second data directly to the destination computing resource.

These operations performed in response to receiving the appended-read command can also be chained together. In this manner, an appended-read command, implemented as an appended-read packet, is transmitted from an originator computing resource to a first intermediary computing resource (e.g., a first memory controller.) The first intermediary computing resource retrieves some specified data, then the appended-read packet is updated and the updated appended-read packet is transmitted to a second intermediary computing resource. The second intermediary computing resource retrieves more data and sends a newly updated appended-read packet to a third intermediary computing resource, and so on until all the required data has been aggregated and the aggregated data is sent to a destination computing resource.

Prior to describing example implementations of the disclosed technologies for performing appended-read operations by one or more computing resources of a computing system, where communication between the computing resources is carried out based on network on a chip architecture, structural aspects and functional aspects of the computing system and of the computing resources are described first.

FIG. 1A shows an exemplary computing system 100 according to the present disclosure. The computing system 100 includes at least one processing device 102. A typical computing system 100, however, may include a plurality of processing devices 102. In some implementations, each processing device 102, which may also be referred to as device 102, includes a router 104, a device controller 106, a plurality of high speed interfaces 108 and a plurality of clusters 110. The router 104 may also be referred to as a top level router or a level one router. Each cluster 110 includes a plurality of processing engines to provide computational capabilities for the computing system 100. In some implementations, the high speed interfaces 108 include communication ports to communicate data outside of the device 102, for example, to other devices 102 of the computing system 100 and/or interfaces to other computing systems. Unless specifically expressed otherwise, data as used herein may refer to both program code and pieces of information upon which the program code operates.

In some implementations, the processing device 102 includes 2, 4, 8, 16, 32 or another number of high speed interfaces 108. Each high speed interface 108 may implement a physical communication protocol. For example, each high speed interface 108 implements the media access control (MAC) protocol, and thus may have a unique MAC address associated with it. The physical communication may be implemented in a known communication technology, for example, Gigabit Ethernet, or any other existing or future-developed communication technology. For example, each high speed interface 108 implements bi-directional high-speed serial ports, such as 10 Giga bits per second (Gbps) serial ports. Two processing devices 102 implementing such high speed interfaces 108 may be directly coupled via one pair or multiple pairs of the high speed interfaces 108, with each pair including one high speed interface 108 on one processing device 102 and another high speed interface 108 on the other processing device 102.

Figure 5:
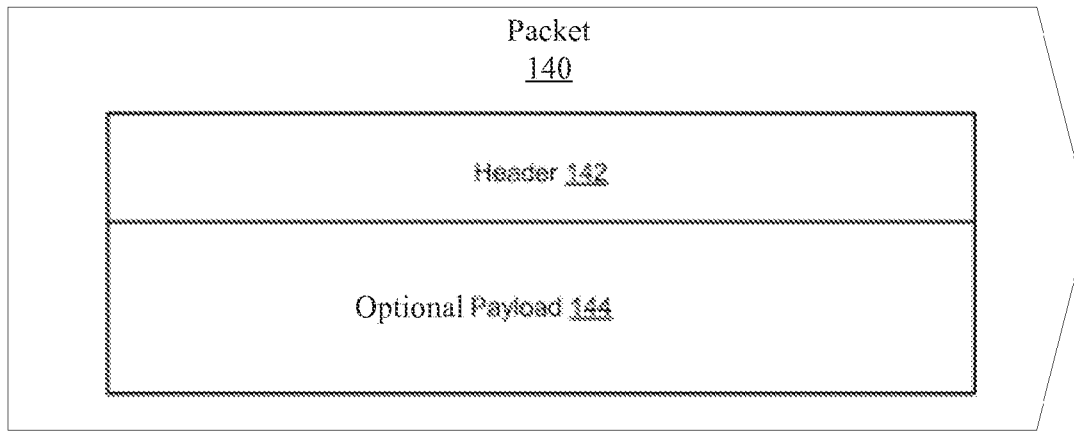
FIG. 5 is a block diagram of an example of a packet used to address a computing resource of a computing system.

In accordance with network on a chip architecture, data communication between different computing resources of the computing system 100 is implemented using routable packets. The computing resources include device level resources such as a device controller 106, cluster level resources such as a cluster controller or cluster memory controller, and/or the processing engine level resources such as individual processing engines and/or individual processing engine memory controllers. An example of a routable packet 140 (or simply packet 140) is shown in FIG. 5. The packet 140 includes a header 142. Optionally, the packet also includes a payload 144. The header 142 includes a routable destination address for the packet 140. The router 104 may be a top-most router configured to route packets on each processing device 102. In some implementations, the router 104 is a programmable router. That is, the routing information used by the router 104 may be programmed and updated. In some cases, the router 104 is implemented using an address resolution table (ART) or Look-up table (LUT) to route any packet it receives on the high speed interfaces 108, or any of the internal interfaces interfacing the device controller 106 or clusters 110. For example, depending on the destination address, a packet 140 received from one cluster 110 may be routed to a different cluster 110 on the same processing device 102, or to a different processing device 102; and a packet 140 received from one high speed interface 108 may be routed to a cluster 110 on the processing device or to a different processing device 102.

In some implementations, the device controller 106 controls the operation of the processing device 102 from power on through power down. In some implementations, the device controller 106 includes a device controller processor, one or more registers and a device controller memory space. The device controller processor may be any existing or future-developed microcontroller. In some implementations, for example, an ARM® Cortex M0 microcontroller is used for its small footprint and low power consumption. In other implementations, a bigger and more powerful microcontroller is chosen if needed. The one or more registers include one to hold a device identifier (DEVID) for the processing device 102 after the processing device 102 is powered up. The DEVID is used to uniquely identify the processing device 102 in the computing system 100. In some implementations, the DEVID is loaded on system start from a non-volatile storage, for example, a non-volatile internal storage on the processing device 102 or a non-volatile external storage. The device controller memory space may include both read-only memory (ROM) and random access memory (RAM). In some implementations, the ROM may store bootloader code that during a system start is executed to initialize the processing device 102 and load the remainder of the boot code through a bus from outside of the device controller 106. In some implementations, the instructions for the device controller processor, also referred to as the firmware, reside in the RAM after they are loaded during the system start.

Here, the registers and device controller memory space of the device controller 106 are read and written to by computing resources of the computing system 100 using packets. That is, they are addressable using packets. As used herein, the term "memory" may refer to RAM, SRAM, DRAM, eDRAM, SDRAM, volatile memory, non-volatile memory, and/or other types of electronic memory. For example, the header of a packet includes a destination address such as DEVID:PADDR, of which the DEVID may identify the processing device 102 and the PADDR may be an address for a register of the device controller 106 or a memory location of the device controller memory space of a processing device 102. In some implementations, a packet directed to the device controller 106 has a packet operation code, which may be referred to as packet opcode or just opcode, to indicate what operation needs to be performed for the packet. For example, the packet operation code may indicate reading from or writing to the storage location pointed to by PADDR. It should be noted that the device controller 106 also sends packets in addition to receiving them. The packets sent by the device controller 106 may be self-initiated or in response to a received packet (e.g., a read request). Self-initiated packets include, for example, reporting status information, requesting data, etc.

Figure 1B:
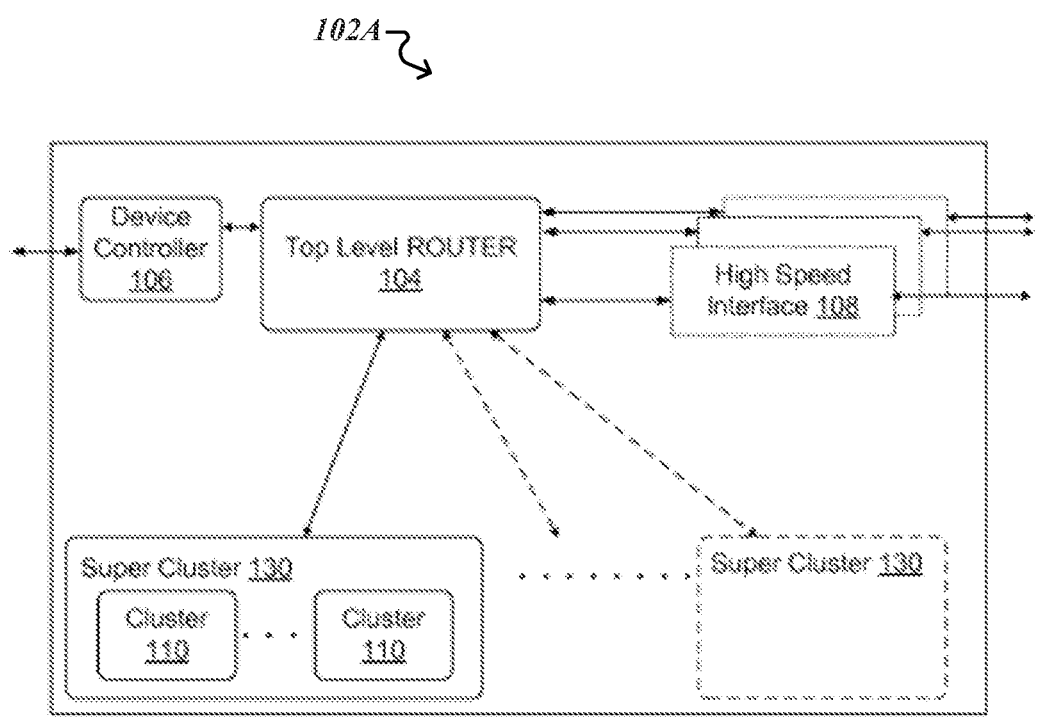
FIG. 1B is a block diagram of an example of a processing device of a computing system.

In some implementations, a plurality of clusters 110 on a processing device 102 are grouped together. FIG. 1B shows a block diagram of another example of a processing device 102A of the computing system 100. The example processing device 102A is one particular embodiment of the processing device 102. Therefore, the processing device 102 referred to in the present disclosure may include any embodiments of the processing device 102, including the example processing device 102A. As shown on FIG. 1B, a plurality of clusters 110 may be grouped together to form a super cluster 130 and the example of processing device 102A may include a plurality of such super clusters 130. In some implementations, a processing device 102 includes 2, 4, 8, 16, 32 or another number of clusters 110, without further grouping the clusters 110 into super clusters. In other implementations, a processing device 102 may include 2, 4, 8, 16, 32 or another number of super clusters 130 and each super cluster 130 may comprise a plurality of clusters.

Figure 2A:
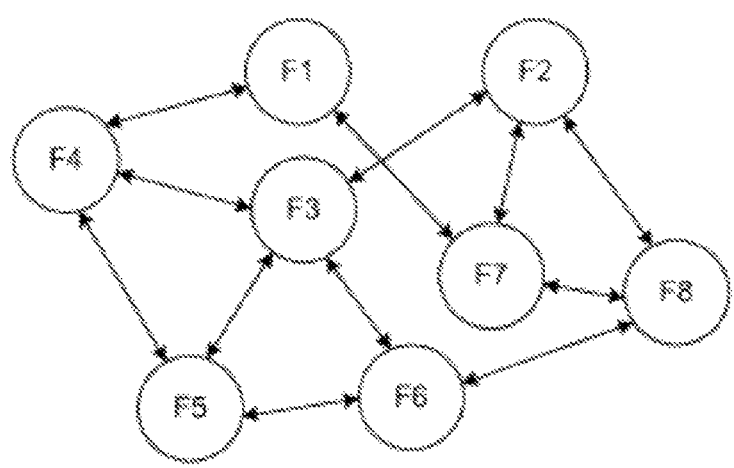
FIG. 2A is a block diagram of topology of connections of an example of a computing system.

FIG. 2A shows a block diagram of an example of a computing system 100A. The computing system 100A may be one example implementation of the computing system 100 of FIG. 1A. The computing system 100A includes a plurality of processing devices 102 designated as F1, F2, F3, F4, F5, F6, F7 and F8. As shown in FIG. 2A, each processing device 102 is directly coupled to one or more other processing devices 102. For example, F4 is directly coupled to F1, F3 and F5; and F7 is directly coupled to F1, F2 and F8. Within computing system 100A, one of the processing devices 102 may function as a host for the whole computing system 100A. In some implementations, the host has a unique device ID that every processing devices 102 in the computing system 100A recognizes as the host. Any of the processing devices 102 may be designated as the host for the computing system 100A. For example, F1 may be designated as the host and the device ID for F1 is set as the unique device ID for the host.

In other implementations, the host is a computing device of a different type, such as a computer processor (for example, an ARM® Cortex or Intel® x86 processor). Here, the host communicates with the rest of the system 100A through a communication interface, which represents itself to the rest of the system 100A as the host by having a device ID for the host.

The computing system 100A may implement any appropriate techniques to set the DEVIDs, including the unique DEVID for the host, to the respective processing devices 102 of the computing system 100A. In some implementations, the DEVIDs are stored in the ROM of the respective device controller 106 for each processing devices 102 and loaded into a register for the device controller 106 at power up. In other implementations, the DEVIDs are loaded from an external storage. Here, the assignments of DEVIDs may be performed offline (when there is no application running in the computing system 100A), and may be changed offline from time to time or as appropriate. Thus, the DEVIDs for one or more processing devices 102 may be different each time the computing system 100A initializes. Moreover, the DEVIDs stored in the registers for each device controller 106 may be changed at runtime. This runtime change is controlled by the host of the computing system 100A. For example, after the initialization of the computing system 100A, which loads the pre-configured DEVIDs from ROM or external storage, the host of the computing system 100A may reconfigure the computing system 100A and assign different DEVIDs to the processing devices 102 in the computing system 100A to overwrite the initial DEVIDs in the registers of the device controllers 106.

Figure 2B:
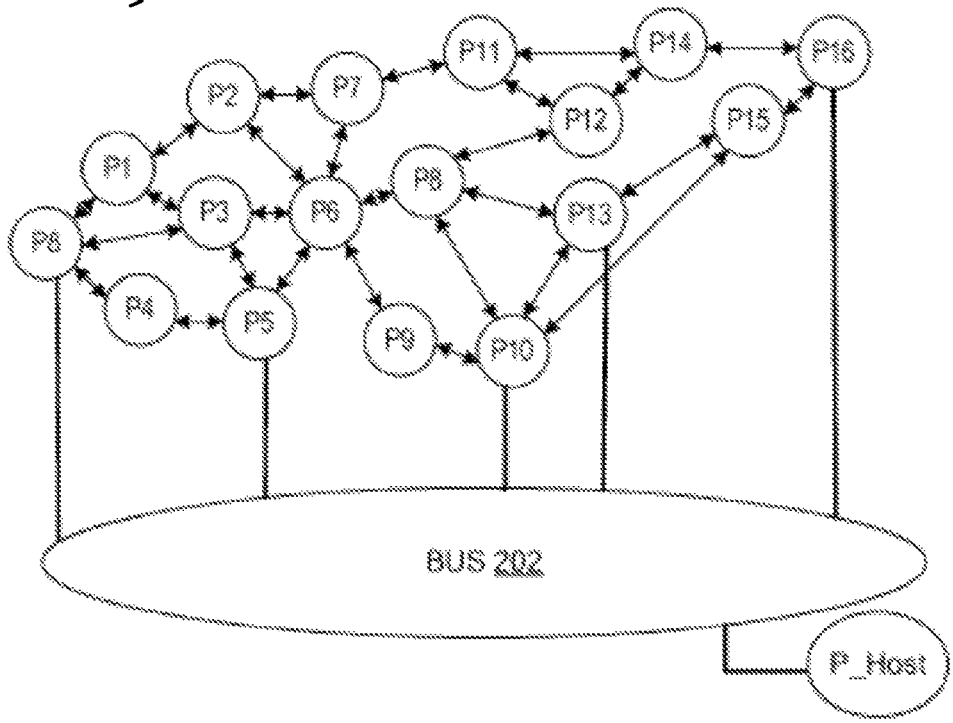
FIG. 2B is a block diagram of topology of connections of another example of a computing system.

FIG. 2B is a block diagram of a topology of another example of a computing system 100B. The computing system 100B is another example implementation of the computing system 100 of FIG. 1 and includes a plurality of processing devices 102 (designated as P1 through P16 on FIG. 2B), a bus 202 and a processing device P_Host. Each processing device of P1 through P16 is directly coupled to another processing device of P1 through P16 by a direct link between them. At least one of the processing devices P1 through P16 is coupled to the bus 202. In the example shown in FIG. 2B, the processing devices P8, P5, P10, P13, P15 and P16 are coupled to the bus 202. Here, the processing device P_Host is coupled to the bus 202 and is designated as the host for the computing system 100B. In the computing system 100B, the host may be a computer processor (for example, an ARM® Cortex or Intel® x86 processor). The host communicates with the rest of the computing system 100B through a communication interface coupled to the bus and represents itself to the rest of the system 100B as the host by having a device ID for the host.

Figure 3A:
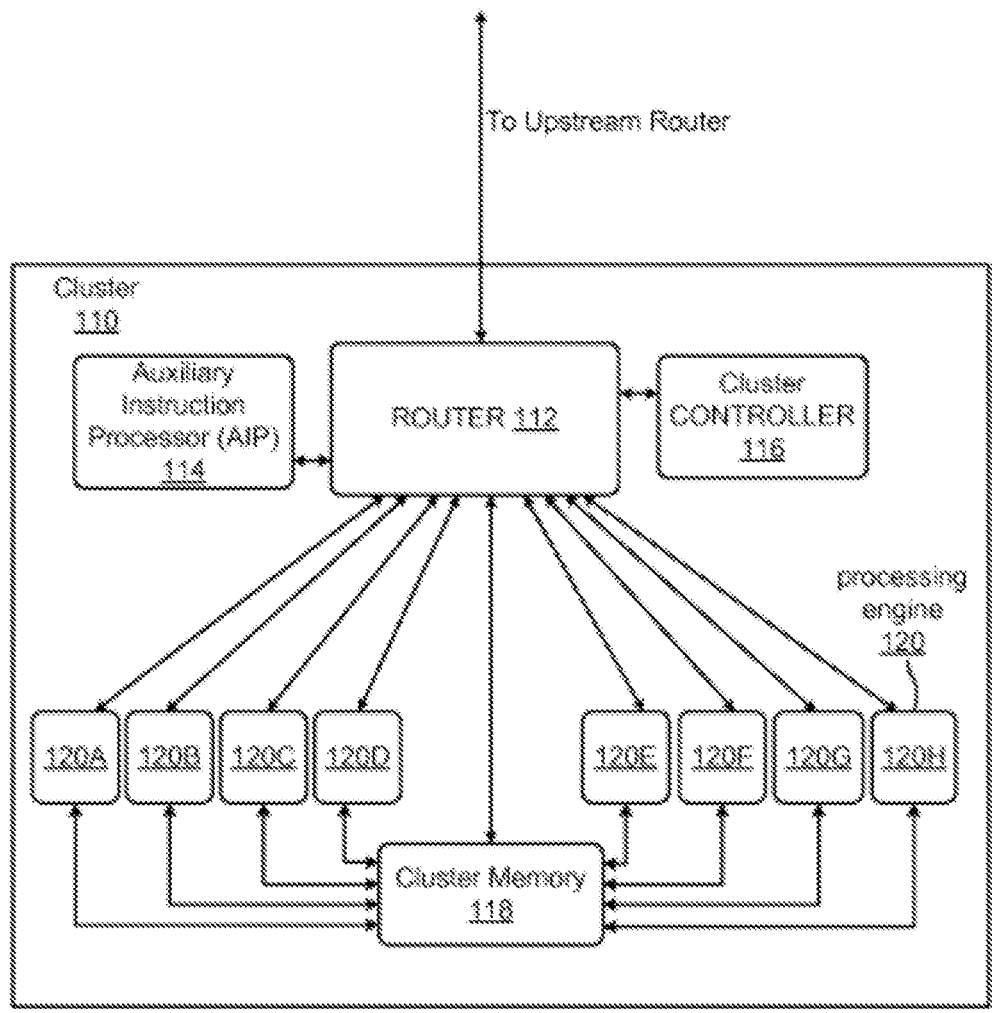
FIG. 3A is a block diagram of an example of a cluster of a computing device.

FIG. 3A shows a block diagram of an example of a cluster 110. The cluster 110 includes a router 112, a cluster controller 116, an auxiliary instruction processor (AIP) 114, a cluster memory 118 and a plurality of processing engines 120. The router 112 is coupled to an upstream router to provide interconnection between the upstream router and the cluster 110. The upstream router may be, for example, the router 104 of the processing device 102 if the cluster 110 is not part of a super cluster 130.

In accordance with network on a chip architecture, examples of operations to be performed by the router 112 include receiving a packet destined for a computing resource within the cluster 110 from outside the cluster 110 and/or transmitting a packet originating within the cluster 110 destined for a computing resource inside or outside the cluster 110. A computing resource within the cluster 110 may be, for example, the cluster memory 118 or any of the processing engines 120 within the cluster 110. A computing resource outside the cluster 110 may be, for example, a computing resource in another cluster 110 of the computer device 102, the device controller 106 of the processing device 102, or a computing resource on another processing device 102. In some implementations, the router 112 also transmits a packet to the router 104 even if the packet may target a resource within itself. In some cases, the router 104 implements a loopback path to send the packet back to the originating cluster 110 if the destination resource is within the cluster 110.

In some implementations, the cluster controller 116 sends packets, for example, as a response to a read request, or as unsolicited data sent by hardware for error or status report. The cluster controller 116 also receives packets, for example, packets with opcodes to read or write data. In some implementations, the cluster controller 116 is a microcontroller, for example, one of the ARM® Cortex-M microcontrollers and includes one or more cluster control registers (CCRs) that provide configuration and control of the cluster 110. In other implementations, instead of using a microcontroller, the cluster controller 116 is custom made to implement any functionalities for handling packets and controlling operation of the router 112. Here, the functionalities may be referred to as custom logic and may be implemented, for example, by FPGA or other specialized circuitry. Regardless of whether it is a microcontroller or implemented by custom logic, the cluster controller 116 may implement a fixed-purpose state machine encapsulating packets and memory access to the CCRs.

In some implementations, each cluster memory 118 is part of the overall addressable memory of the computing system 100. That is, the addressable memory of the computing system 100 includes the cluster memories 118 of all clusters of all devices 102 of the computing system 100. The cluster memory 118 is a part of the main memory shared by the computing system 100. In some implementations, any memory location within the cluster memory 118 may be addressed by any processing engine within the computing system 100 by a physical address. In some implementations, the physical address is a combination of the DEVID, a cluster identifier (CLSID) and a physical address location (PADDR) within the cluster memory 118. As such, the physical address is formed as a string of bits, e.g., DEVID:CLSID:PADDR. The DEVID may be associated with the device controller 106 as described above and the CLSID may be a unique identifier to uniquely identify the cluster 110 within the local processing device 102. It should be noted that in at least some implementations, each register of the cluster controller 116 also be assigned a physical address (PADDR). Therefore, the physical address DEVID:CLSID:PADDR may also be used to address a register of the cluster controller 116, in which PADDR may be an address assigned to the register of the cluster controller 116.

In some other implementations, any memory location within the cluster memory 118 is addressed by any processing engine within the computing system 100 by a virtual address. The virtual address may be a combination of a DEVID, a CLSID and a virtual address location (ADDR). As such, the virtual address is formed as a string of bits, e.g., DEVID:CLSID:ADDR. The DEVID and CLSID in the virtual address may be the same as in the physical addresses.

In some cases, the width of ADDR is specified by system configuration. For example, the width of ADDR is loaded into a storage location convenient to the cluster memory 118 during system start and/or changed from time to time when the computing system 100 performs a system configuration. In some implementations, to convert the virtual address to a physical address, the value of ADDR is added to a base physical address value (BASE). The BASE may also be specified by system configuration as the width of ADDR and stored in a location convenient to a memory controller of the cluster memory 118. In one example, the width of ADDR is stored in a first register and the BASE is stored in a second register in the memory controller. Thus, the virtual address DEVID:CLSID:ADDR is converted to a physical address as DEVID:CLSID:ADDR+BASE. Note that the result of ADDR+BASE has the same width as the target physical address.

The address in the computing system 100 may be 8 bits, 16 bits, 32 bits, 64 bits, or any other number of bits wide. In some implementations, the address is 32 bits wide. The DEVID may be 10, 15, 20, 25 or any other number of bits wide. The width of the DEVID is chosen based on the size of the computing system 100, for example, how many processing devices 102 the computing system 100 has or is designed to have. In some implementations, the DEVID is 20 bits wide and the computing system 100 using this width of DEVID contains up to $2^{20}$ processing devices 102. The width of the CLSID is chosen based on how many clusters 110 the processing device 102 is designed to have. For example, the CLSID may be 3, 4, 5, 6, 7, 8 bits or any other number of bits wide. In some implementations, the CLSID is 5 bits wide and the processing device 102 using this width of CLSID contains up to $2^5$ clusters. The width of the PADDR for the cluster level may be 20, 30 or any other number of bits. For example, the PADDR for the cluster level is 27 bits and the cluster 110 using this width of PADDR contains up to $2^{27}$ memory locations and/or addressable registers. Therefore, in some implementations, if the DEVID is 20 bits wide, CLSID is 5 bits and PADDR has a width of 27 bits, then a physical address DEVID:CLSID:PADDR or DEVID:CLSID:ADDR+BASE is 52 bits.

For performing the virtual to physical memory conversion, the first register (ADDR register) may have 4, 5, 6, 7 bits or any other number of bits. In some implementations, the first register is 5 bits wide. If the value of the 5 bits register is four (4), the width of ADDR is 4 bits; and if the value of 5 bits register is eight (8), the width of ADDR will be 8 bits. Regardless of ADDR being 4 bits or 8 bits wide, if the PADDR for the cluster level is 27 bits, then BASE is 27 bits, and the result of ADDR+BASE still is a 27 bits physical address within the cluster memory 118.

In the example illustrated in FIG. 3A, a cluster 110 includes one cluster memory 118. In other examples, a cluster 110 includes a plurality of cluster memories 118 that each includes a memory controller and a plurality of memory banks, respectively. Moreover, in yet another example, a cluster 110 includes a plurality of cluster memories 118 and these cluster memories 118 are connected together via a router that are downstream of the router 112.

The AIP 114 is a special processing engine shared by all processing engines 120 of one cluster 110. In some implementations, the AIP 114 is implemented as a coprocessor to the processing engines 120. For example, the AIP 114 implements less commonly used instructions such as some floating point arithmetic, including but not limited to, one or more of addition, subtraction, multiplication, division and square root, etc. In the example shown in FIG. 3A, the AIP 114 is coupled to the router 112 directly and is configured to send and receive packets via the router 112. As a coprocessor to the processing engines 120 within the same cluster 110, although not shown in FIG. 3A, the AIP 114 may also be coupled to each processing engines 120 within the same cluster 110 directly. In other implementations, a bus shared by all the processing engines 120 within the same cluster 110 is used for communication between the AIP 114 and all the processing engines 120 within the same cluster 110. In some other implementations, a multiplexer is used to control access to the bus shared by all the processing engines 120 within the same cluster 110 for communication with the AIP 114. In yet other implementations, a multiplexer is used to control communication between the AIP 114 and all the processing engines 120 within the same cluster 110.

Figure 3B:
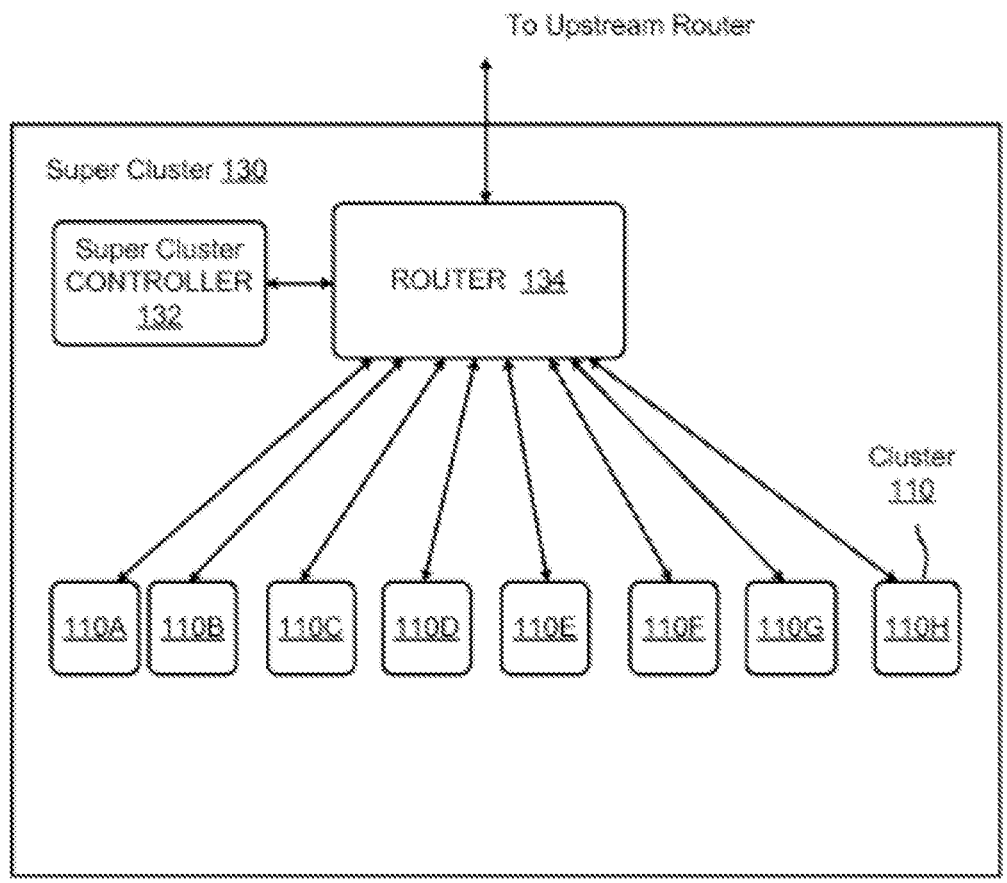
FIG. 3B is a block diagram of an example of a super cluster of a computing device.

The grouping of the processing engines 120 on a computing device 102 may have a hierarchy with multiple levels. For example, multiple clusters 110 are grouped together to form a super cluster. FIG. 3B is a block diagram of an example of a super cluster 130 of the computing device 102. In the example shown in FIG. 3B, a plurality of clusters 110A through 110H are grouped into the super cluster 130. Although 8 clusters are shown in the super cluster 130 on FIG. 3B, the super cluster 130 may include 2, 4, 8, 16, 32 or another number of clusters 110. The super cluster 130 includes a router 134 and a super cluster controller 132, in addition to the plurality of clusters 110. The router 134 is configured to route packets among the clusters 110 and the super cluster controller 132 within the super cluster 130, and to and from computing resources outside the super cluster 130 via a link to an upstream router. In implementations in which the super cluster 130 is used in a processing device 102A, the upstream router for the router 134 is the top level router 104 of the processing device 102A and the router 134 is an upstream router for the router 112 within the cluster 110. In some implementations, the super cluster controller 132 may be configured to implement CCRs, receive and send packets, and implement a fixed-purpose state machine encapsulating packets and memory access to the CCRs. In some cases, the super cluster controller 132 is implemented similar to the way the cluster controller 116 is implemented in a cluster 110. In other implementations, the super cluster 130 is implemented with just the router 134 and does not have a super cluster controller 132.

As noted above, a cluster 110 may include 2, 4, 8, 16, 32 or another number of processing engines 120. FIG. 3A shows an example of a plurality of processing engines 120 that have been grouped into a cluster 110, and FIG. 3B shows an example of a plurality of clusters 110 that have been grouped into a super cluster 130. Grouping of processing engines is not limited to clusters or super clusters. In some implementations, more than two levels of grouping is implemented and each level has its own router and controller.

Figure 4:
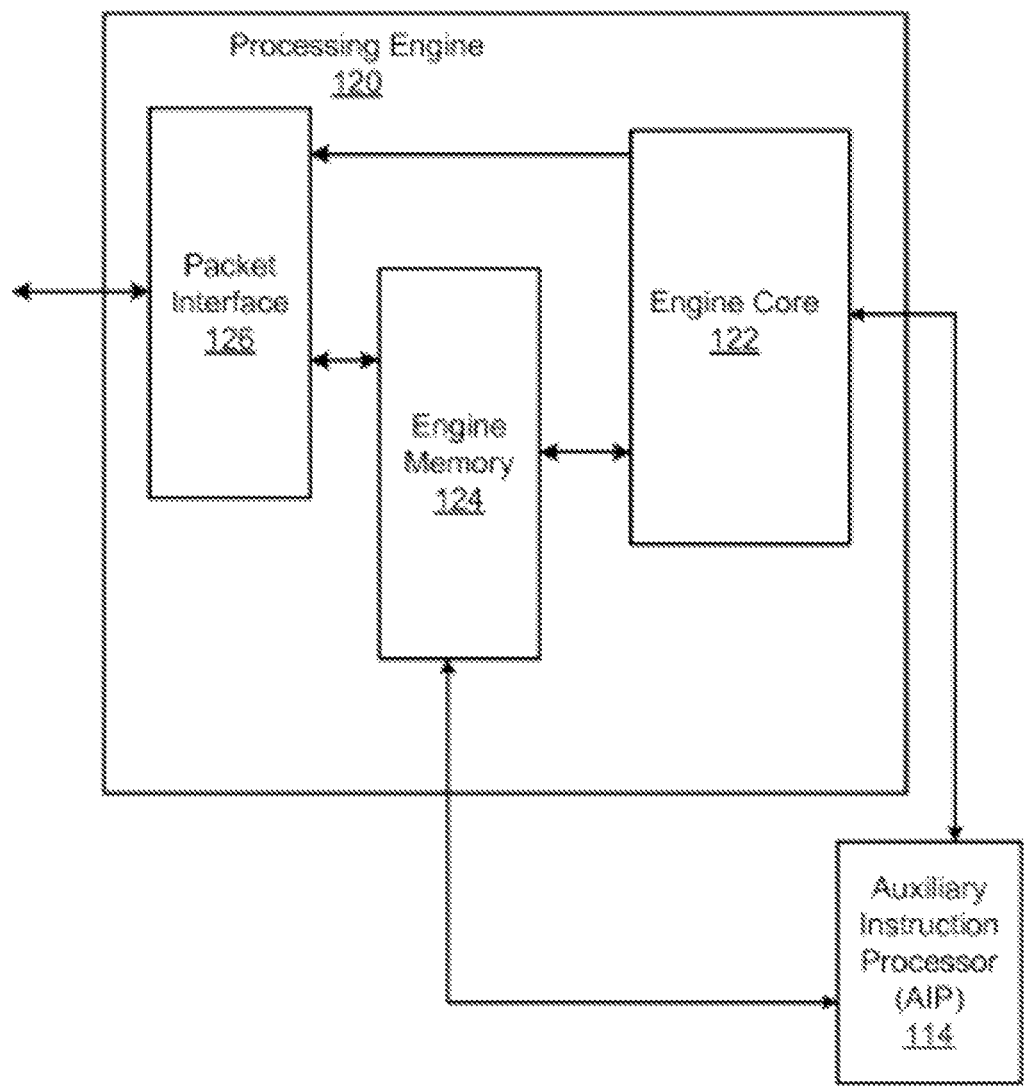
FIG. 4 is a block diagram of an example of a processing engine of a cluster.

FIG. 4 shows a block diagram of an example of a processing engine 120 of a processing device 102. In the example shown in FIG. 4, the processing engine 120 includes an engine core 122, an engine memory 124 and a packet interface 126. Here, the processing engine 120 is directly coupled to an AIP 114. As described above, the AIP 114 may be shared by all processing engines 120 within a cluster 110. In some implementations, the processing core 122 is a central processing unit (CPU) with an instruction set and implements some or all features of modern CPUs, such as, for example, a multi-stage instruction pipeline, one or more arithmetic logic units (ALUs), one or more floating point units (FPUs) or any other CPU technology. The instruction set includes one instruction set for the ALU to perform arithmetic and logic operations, and another instruction set for the FPU to perform floating point operations. In some cases, the FPU is a completely separate execution unit containing a multi-stage, single-precision floating point pipeline. When an FPU instruction reaches the instruction pipeline of the processing engine 120, the instruction and its source operand(s) are dispatched to the FPU.

The instructions of the instruction set may implement the arithmetic and logic operations and the floating point operations, such as those in the INTEL® x86 instruction set, using a syntax similar or different from the x86 instructions. In some implementations, the instruction set includes customized instructions. For example, one or more instructions are implemented according to the features of the computing system 100 and in accordance with network on a chip architecture. In one example, one or more instructions cause the processing engine executing the instructions to generate packets directly with system wide addressing. In another example, one or more instructions have a memory address located anywhere in the computing system 100 as an operand. In the latter example, a memory controller of the processing engine executing the instruction generates packets according to the memory address being accessed.

The engine memory 124 includes a program memory, a register file including one or more general purpose registers, one or more special registers and one or more events registers. In some implementations, the program memory is a physical memory for storing instructions to be executed by the processing core 122 and data to be operated upon by the instructions. In some cases, portions of the program memory are disabled and powered down for energy savings. For example, a top half or a bottom half of the program memory is disabled to save energy when executing a program small enough that half or less of the storage may be needed. The size of the program memory may be 1 thousand (1K), 2K, 3K, 4K, or any other number of storage units. The register file may include 128, 256, 512, 1024, or any other number of storage units. In some implementations, the storage unit is 32-bit wide, which may be referred to as a longword, and the program memory includes 2K 32-bit longwords and the register file includes 256 32-bit registers.

In some implementations, the register file includes one or more general purpose registers and special registers for the processing core 122. The general purpose registers serve functions that are similar or identical to the general purpose registers of an x86 architecture CPU. The special registers are used for configuration, control and/or status, for instance. Examples of special registers include one or more of the following registers: a next program counter, which may be used to point to the program memory address where the next instruction to be executed by the processing core 122 is stored; and a device identifier (DEVID) register storing the DEVID of the processing device 102.

In some implementations, the register file is implemented in two banks—one bank for odd addresses and one bank for even addresses—to permit multiple fast accesses during operand fetching and storing. The even and odd banks are selected based on the least-significant bit of the register address if the computing system 100 is implemented in little endian or on the most-significant bit of the register address if the computing system 100 is implemented in big-endian.

In some implementations, the engine memory 124 is part of the addressable memory space of the computing system 100. That is, any storage location of the program memory, any general purpose register of the register file, any special register of the plurality of special registers and any event register of the plurality of events registers is assigned a memory address PADDR. Each processing engine 120 on a processing device 102 is assigned an engine identifier (ENGINE ID), therefore, to access the engine memory 124, any addressable location of the engine memory 124 may be addressed by DEVID:CLSID:ENGINE ID: PADDR. In some cases, a packet addressed to an engine level memory location includes an address formed as DEVID:CLSID: ENGINE ID: EVENTS:PADDR, in which EVENTS is one or more bits to set event flags in the destination processing engine 120. It should be noted that when the address is formed as such, the events need not form part of the physical address, which is still DEVID:CLSID:ENGINE ID:PADDR. In this form, the events bits may identify one or more event registers to be set but these events bits are separate from the physical address being accessed.

In accordance with network on a chip architecture, the packet interface 126 includes a communication port for communicating packets of data. The communication port is coupled to the router 112 and the cluster memory 118 of the local cluster. For any received packets, the packet interface 126 directly passes them through to the engine memory 124. In some cases, a processing device 102 implements two mechanisms to send a data packet to a processing engine 120. A first mechanism uses a data packet with a read or write packet opcode. This data packet is delivered to the packet interface 126 and handled by the packet interface 126 according to the packet opcode. Here, the packet interface 126 includes a buffer to hold a plurality of storage units, for example, 1K, 2K, 4K, or 8K or any other number. In a second mechanism, the engine memory 124 further includes a register region to provide a write-only, inbound data interface, which may be referred to a mailbox. In some implementations, the mailbox includes two storage units that each can hold one packet at a time. Here, the processing engine 120 has an event flag, which is set when a packet has arrived at the mailbox to alert the processing engine 120 to retrieve and process the arrived packet. While this packet is being processed, another packet may be received in the other storage unit, but any subsequent packets are buffered at the sender, for example, the router 112 or the cluster memory 118, or any intermediate buffers.

In various implementations, data request and delivery between different computing resources of the computing system 100 is implemented by packets. FIG. 5 illustrates a block diagram of an example of a packet 140 in accordance with network on a chip architecture. As shown in FIG. 5, the packet 140 includes a header 142 and an optional payload 144. The header 142 includes a single address field, a packet opcode (POP) field and a size field. The single address field indicates the address of the destination computing resource of the packet, which may be, for example, an address at a device controller level such as DEVID:PADDR, an address at a cluster level such as a physical address DEVID:CLSID: PADDR or a virtual address DEVID:CLSID:ADDR, or an address at a processing engine level such as DEVID:CLSID: ENGINE ID:PADDR or DEVID:CLSID:ENGINE ID:EVENTS:PADDR. The POP field may include a code to indicate an operation to be performed by the destination computing resource. Exemplary operations in the POP field may include read (to read data from the destination) and write (to write data (e.g., in the payload 144) to the destination).

In some implementations, examples of operations in the POP field further include bulk data transfer. For example, certain computing resources implement a direct memory access (DMA) feature. Examples of computing resources that implement DMA may include a cluster memory controller of each cluster memory 118, a memory controller of each engine memory 124, and a memory controller of each device controller 106. Any computing resource that implements the DMA may perform bulk data transfer to another computing resource using packets with a packet opcode for bulk data transfer.

In addition to bulk data transfer, the examples of operations in the POP field further include transmission of unsolicited data. For example, any computing resource may generate a status report or incur an error during operation, the status or error is reported to a destination using a packet with a packet opcode indicating that the payload 144 contains the source computing resource and the status or error data.

The POP field may be 2, 3, 4, 5 or any other number of bits wide. In some implementations, the width of the POP field is selected depending on the number of operations defined for packets in the computing system 100. Also, in some embodiments, a packet opcode value can have different meaning based on the type of the destination computing resource that receives it. For example, for a three-bit POP field, a value 001 may be defined as a read operation for a processing engine 120 but a write operation for a cluster memory 118.

In some implementations, the header 142 further includes an addressing mode field and an addressing level field. Here, the addressing mode field contains a value to indicate whether the single address field contains a physical address or a virtual address that may need to be converted to a physical address at a destination. Further here, the addressing level field contains a value to indicate whether the destination is at a device, cluster memory or processing engine level.

The payload 144 of the packet 140 is optional. If a particular packet 140 does not include a payload 144, the size field of the header 142 has a value of zero. In some implementations, the payload 144 of the packet 140 contains a return address. For example, if a packet is a read request, the return address for any data to be read may be contained in the payload 144.

Figure 6:
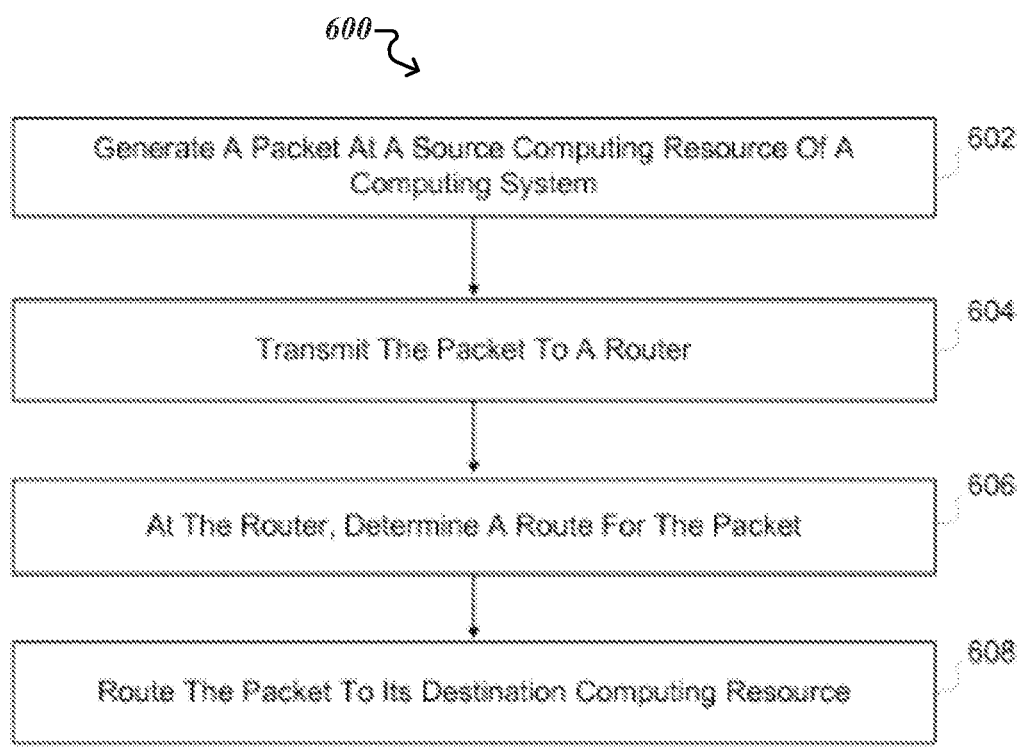
FIG. 6 is a flow diagram showing an example of a process of addressing a computing resource of a computing system using a packet.

FIG. 6 is a flow diagram showing an example of a process 600 of addressing a computing resource of a computing system using a packet in accordance with network on a chip architecture. An implementation of the computing system 100 may have one or more processing devices 102 configured to execute some or all of the operations of the process 600 in response to instructions stored electronically on an electronic storage medium. The one or more processing devices 102 include one or more devices configured through hardware, firmware, and/or software to execute one or more of the operations of the process 600.

The process 600 may start with block 602, at which a packet is generated at a source computing resource of the computing system 100. The source computing resource may be, for example, a device controller 106, a cluster controller 118, a super cluster controller 132 if a super cluster is implemented, an AIP 114, a memory controller for a cluster memory 118, or a processing engine 120. The generated packet may be the packet 140 described above in connection with FIG. 5. From block 602, the exemplary process 600 may continue to the block 604, where the packet is transmitted to an appropriate router based on the source computing resource that generated the packet. For example, if the source computing resource is a device controller 106, the generated packet is transmitted to a top level router 104 of the local processing device 102; if the source computing resource is a cluster controller 116, the generated packet is transmitted to a router 112 of the local cluster 110; if the source computing resource is a memory controller of the cluster memory 118, the generated packet is transmitted to a router 112 of the local cluster 110, or a router downstream of the router 112 if there are multiple cluster memories 118 coupled together by the router downstream of the router 112; and if the source computing resource is a processing engine 120, the generated packet is transmitted to a router of the local cluster 110 if the destination is outside the local cluster and to a memory controller of the cluster memory 118 of the local cluster 110 if the destination is within the local cluster.

At block 606, a route for the generated packet is determined at the router. As described above, the generated packet includes a header that includes a single destination address. The single destination address is any addressable location of a uniform memory space of the computing system 100. The uniform memory space is an addressable space that covers all memories and registers for each device controller, cluster controller, super cluster controller if a super cluster is implemented, cluster memory and processing engine of the computing system 100. In some cases, the addressable location is part of a destination computing resource of the computing system 100. The destination computing resource may be, for example, another device controller 106, another cluster controller 118, a memory controller for another cluster memory 118, or another processing engine 120, which is different from the source computing resource. The router that received the generated packet determines the route for the generated packet based on the single destination address. At block 608, the generated packet is routed to its destination computing resource.

Figure 7A:
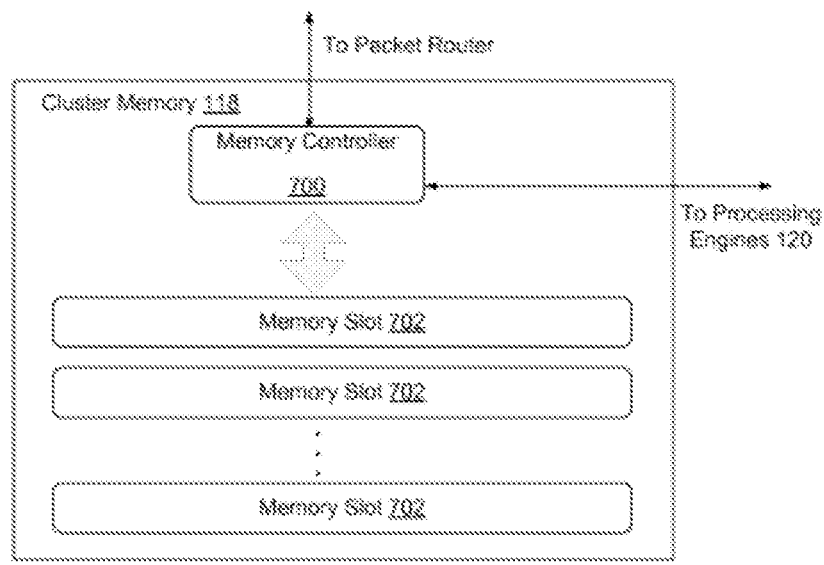
FIG. 7A is a block diagram of an example of a cluster memory.

FIG. 7A is a block diagram of an example of cluster memory 118 of a cluster of a computing device. The cluster memory 118 includes a memory controller 700 and a plurality of memory slots 702. The memory controller 700 may also be referred to as a cluster memory controller to distinguish it from other memory controllers in a processing device 102; for example, a memory controller for a processing engine 120, or a memory controller for a device controller 106.

In the example shown in FIG. 7A, the memory controller 700 is coupled to a packet router and to processing engines 120 via different data links. In implementations which have one cluster memory 118 within a cluster 110, the memory controller 700 is coupled to the router 112 of the cluster 110. The memory controller 700 may also be referred to as a smart memory controller because it implements two different access protocols: by packet access and direct memory access.

In some implementations, the data link between the memory controller 700 and a router is a packet-based data communication. The packet-based data communication uses packets as described above, e.g., such as the packet 140 shown in FIG. 5. In some implementations, the data link between the memory controller 700 and processing engines 120 is a direct data communication. Here, the processing engines 120 coupled to the memory controller 700 are the plurality of processing engines 120 within the same cluster 110 and the direct data communication includes memory access techniques. Examples of existing memory access technologies that may be used for the direct data communication between the memory controller 700 and the plurality of processing engines 120 within the cluster 110 include bus, crossbar, or any other existing memory access techniques for a network on a chip architecture.

The memory slots 702 are slots configured to receive memory banks and are configured for memories such as synchronous dynamic random-access memory (SDRAM), double data rate (DDR) SDRAM, DDR2 SDRAM, DDR3 SDRAM, or 3D RAM.

Figure 7B:
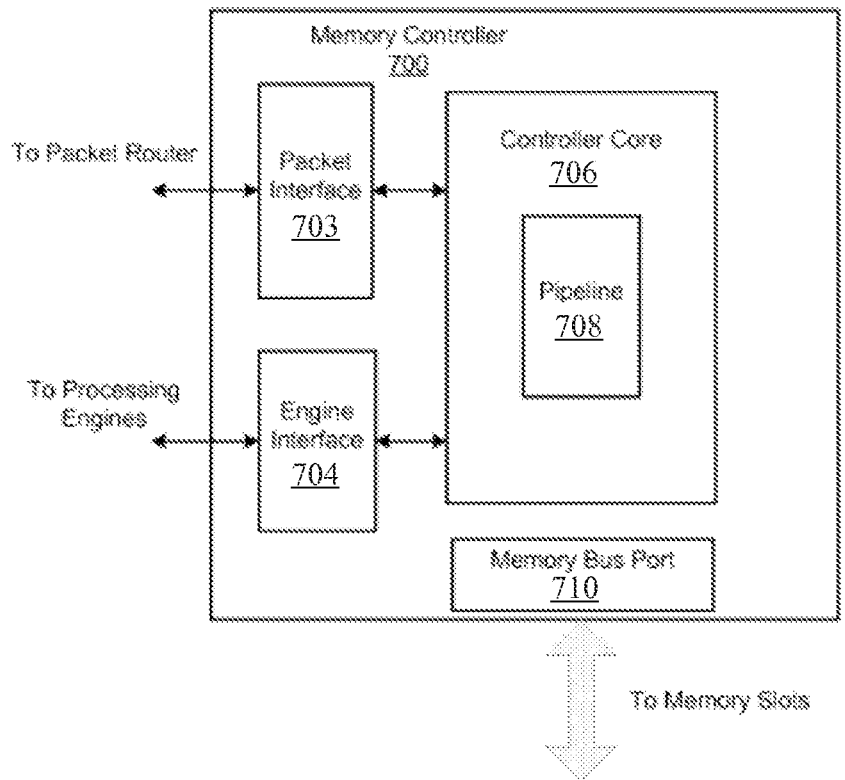
FIG. 7B is a block diagram of an example of a memory controller of a cluster memory.

FIG. 7B is a block diagram of an example memory controller 700 for a cluster memory 118. Here, the memory controller 700 includes a packet interface 703, an engine interface 704, a controller core 706 and a memory bus port 710. The engine interface 704 is configured to support direct memory access by the processing engines 120 within the cluster 110. As such, the engine interface 704 implement part or all features of access technologies, such as but not limited to include bus, crossbar, or any other memory access techniques for a network on a chip architecture. The packet interface 703 includes hardware components configured to receive and transmit packets to a router. In some implementations, the packet interface 703 include a queue to buffer received packets and another queue to buffer packets to be sent. Once a packet is received at the packet interface 703, it is forwarded to the controller core 706 for processing. The memory bus port 710 is a data connection port configured to couple the memory controller 700 to the memory slots 702.

The controller core 706 is configured to decode a received packet, perform a memory operation (if required by the packet opcode), and generate a result packet (if necessary). For example, if a received packet has a packet opcode for a memory write, the controller core 706 extracts data from the received packet and writes the data to the memory bank at an address specified in the packet. Likewise, if a received packet has a packet opcode for a memory read, the controller core 706 reads data from the memory address specified in the packet, places the data in a new packet with a destination address specified in the read packet, and sends the new packet to the packet interface 703 to be queued for transmission. In some implementations, the controller core 706 has a structure similar to a typical CPU. For example, the controller core 706 includes an optional pipeline 708 to perform the steps of decoding the packet, performing the memory operation, and generating a result packet.

Figure 8A:
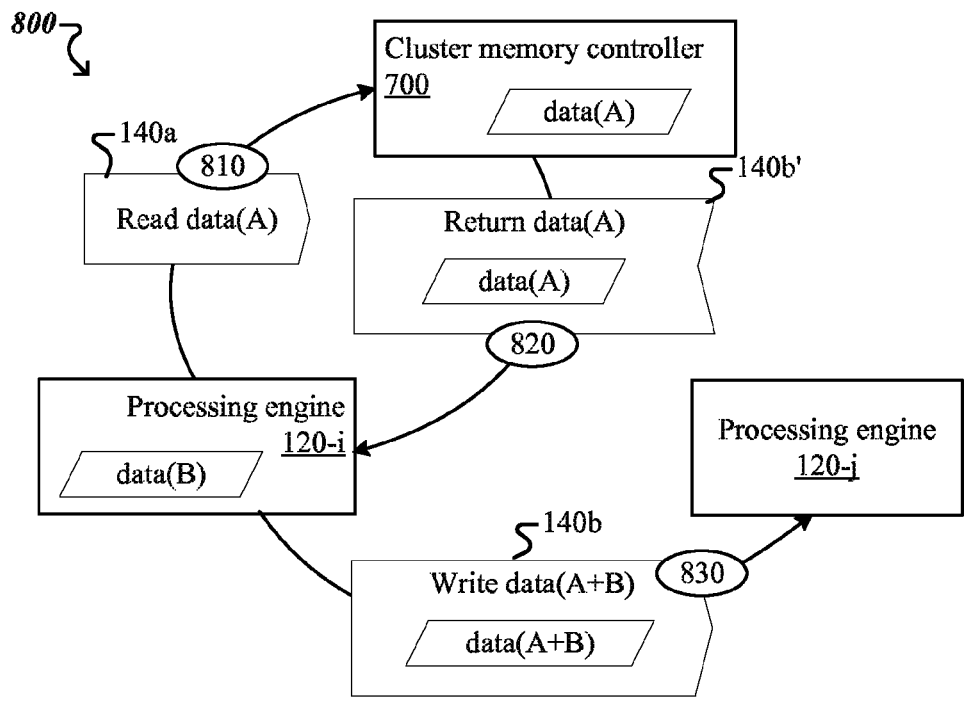
FIGS. 8A and 8B show aspects of respective examples of conventional processes of writing first data, stored at memory associated with an originator computing resource, and second data, stored at memory associated with an intermediary computing resource, to a memory associated with a destination computing resource, where read packets and write packets are used to perform the conventional processes.
Figure 8B:
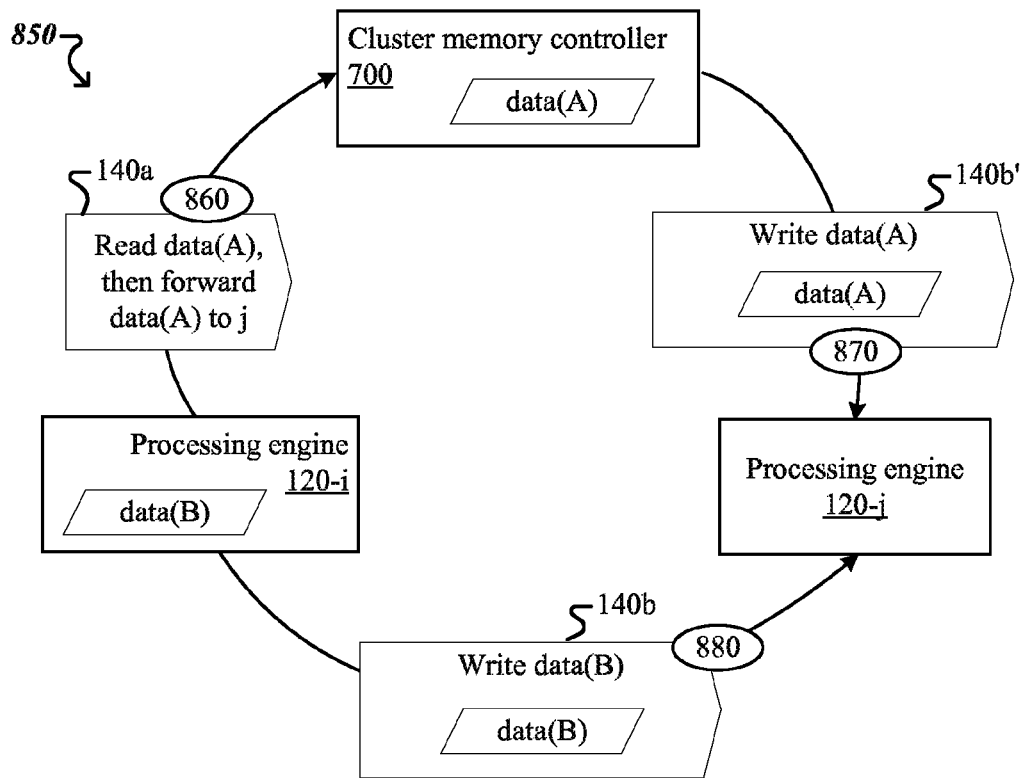

FIGS. 8A and 8B show aspects of respective examples of conventional processes 800 and 850 of writing first data, stored in a memory associated with an originator computing resource, and second data, stored in a memory associated with an intermediary computing resource, to a memory associated with a destination computing resource, where read packets 140a and write packets 140b are used to perform the conventional processes 800 and 850. In some implementations, the originator computing resource, the intermediary computing resource and the destination computing resource are part of a computing system like the computing system 100 described above in connection with FIG. 1A, the computing system 100A described above in connection with FIG. 2A, or the computing system 100B described above in connection with FIG. 2B. Here, the computing resources involved in the conventional processes 800 and 850 can be any of a device controller 106, cluster controller 116, AIP 114, super cluster controller 132, processing engine 120, memory controller 700 of cluster memory 118, or other computing resources of the computing system 100, 100A or 100B.

In the examples illustrated in FIGS. 8A and 8B, the originator computing resource is a processing engine 120-i, the intermediary computing resource is a cluster memory controller 700 and the destination computing resource is another processing engine 120-*j*. Here, a cluster memory (e.g., 118) controlled by the cluster memory controller 700 may be part of the same cluster (e.g., 110) to which one or both of the processing engines 120-*i* and 120-*j* belong, or may be part of a different cluster of the same processing device (e.g., 102) or of a different processing device. Moreover, the processing engines 120-*i* and 120-*j* may be part of the same cluster, or may be part of different clusters of the same processing device or of a different processing device.

Referring now to FIG. 8A, the conventional process 800 of writing data B (denoted data(B)), stored in a memory associated with the processing engine 120-*i*, and data A (denoted data(A)), stored in cluster memory (e.g., 118) controlled by the cluster memory controller 700, to a memory associated with the other processing engine 120-*j* is described first. The processing engine 120-*i* accesses data (B) in the memory associated with the processing engine 120-*i*. Additionally, at 810, the processing engine 120-*i* transmits a read packet 140*a* to instruct the cluster memory controller 700 to read data(A) from the cluster memory. In response to receiving this instruction, the cluster memory controller 700 accesses data(A) in the cluster memory and, at 820, transmits data(A) in a response packet 140*b*' to the processing engine 120-*i*. At 830, the processing engine 120-*i* transmits a write packet 140*b*, that includes data(A) and data(B) (denoted as appended data(A+B)), to the other processing engine 120-*j*. The write packet 140*b* also includes data specifying an instruction for the other processing engine 120-*j* to write appended data(A+B) to the memory associated with the other processing engine 120-*j*. Upon receipt of the write packet 140*b*, the other processing engine 120-*j* writes appended data(A+B) to the memory associated with the other processing engine 120-*j*, as instructed.

Referring now to FIG. 8B, the conventional process 850 of writing data(B), stored in a memory associated with the processing engine 120-*i*, and data(A), stored in cluster memory (e.g., 118) controlled by the cluster memory controller 700, to a memory associated with the other processing engine 120-*j* is described next. The processing engine 120-*i* accesses data(B) in the memory associated with the processing engine 120-*i*. Additionally, at 860, the processing engine 120-*i* transmits a read packet 140*a* to instruct the cluster memory controller 700 to read data(A) from the cluster memory and to forward data(A) to the other processing engine 120-*j* for writing to the memory associated with the other processing engine 120-*j*. In response to receiving this instruction, the cluster memory controller 700 accesses data(A) in the cluster memory and, at 870, transmits data(A) in a write packet 140*b*' to the other processing engine 120-*j*. The write packet 140*b* also includes data specifying an instruction for the other processing engine 120-*j* to write data(A) to the memory associated with the other processing engine 120-*j*. Upon receipt of the write packet 140*b*, the other processing engine 120-*j* writes the data(A) to the memory associated with the other processing engine 120-*j*, as instructed. In the meantime, at 880, the processing engine 120-*i* (asynchronously) transmits another write packet 140*b* that includes data(B) to the other processing engine 120-*j*. The other write packet 140*b* also includes data specifying an instruction for the other processing engine 120-*j* to write data(B) to the memory associated with the other processing engine 120-*j*. Upon receipt of the other write packet 140*b*, the other processing engine 120-*j* writes the data(B) to the memory associated with the other processing engine 120-*j*, as instructed.

Figure 8C:
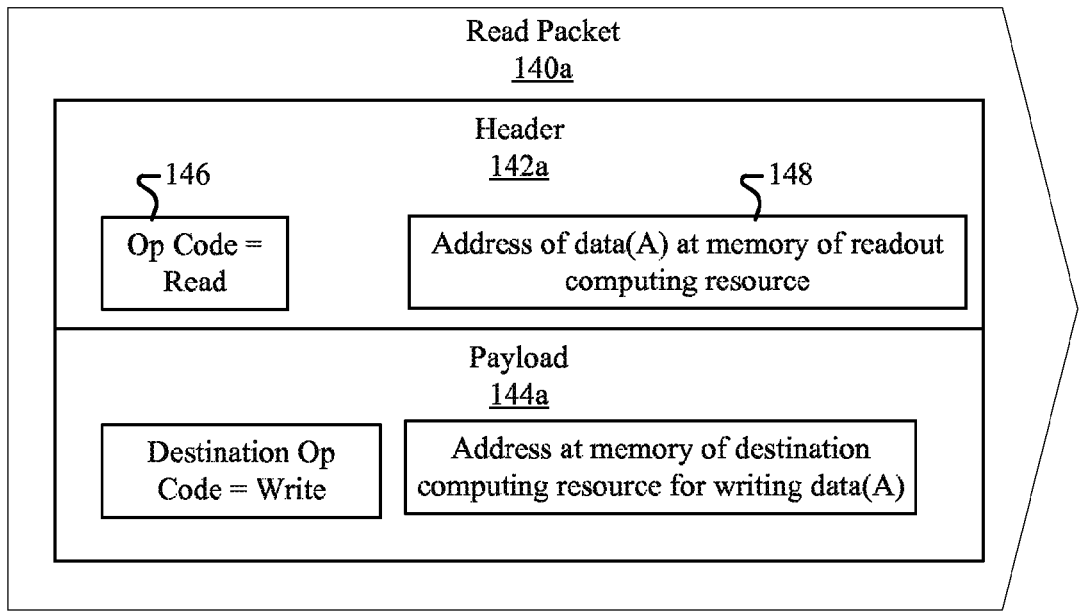
FIG. 8C is a block diagram of an example of a read packet used to address a computing resource of a computing system.

FIG. 8C shows an example of a read packet 140*a* that can be used in either of the conventional processes 800 or 850 to instruct a readout computing resource (e.g., cluster memory controller 700) of a computing system (e.g., 100) to read data(A). In this example, the read packet 140*a* has a header 142*a* and a payload 144*a*. The header 142*a* includes at least an opcode 146 and an address 148 of data(A) at memory associated with the readout computing resource to which the read packet 140*a* is addressed. Here, the opcode 146 has a value corresponding to a "read" operation and specifies an instruction for the readout computing resource to read data(A) from the memory address 148. The memory address 148 can be provided in any of the forms described above in connection with FIG. 5. In the example illustrated in FIG. 8C, the payload 144*a* includes information relating to a destination computing device where data(A) is to be forwarded to after it has been read by the readout computing device from the memory address 148. Here, the payload 144*a* includes at least an opcode that specifies an instruction for the destination computing resource to write data(A), and a memory address at which the destination computing resources should write data(A).

Figure 8D:
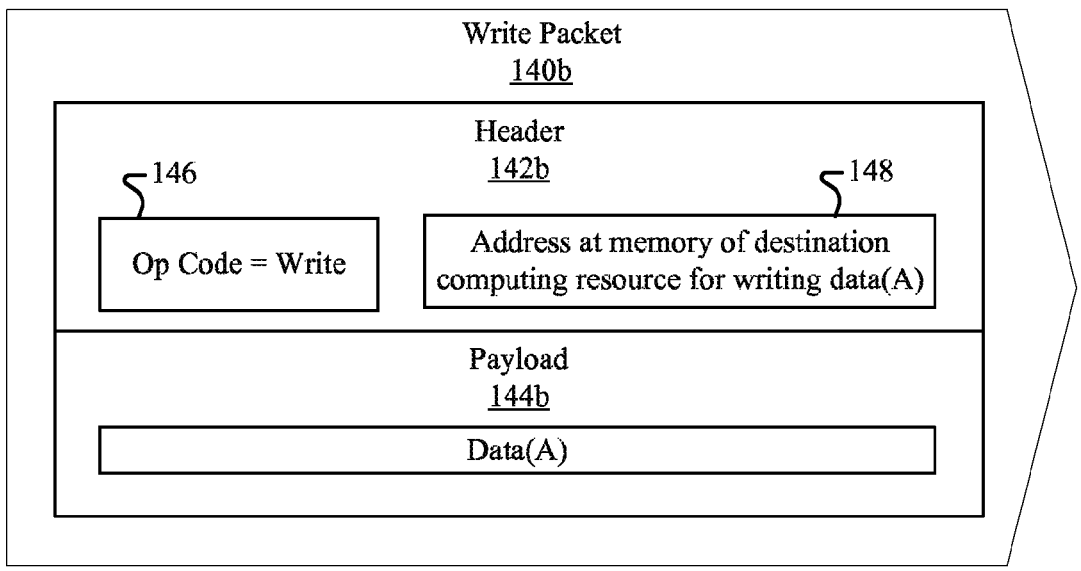
FIG. 8D is a block diagram of an example of a write packet used to address a computing resource of a computing system.

FIG. 8D shows an example of a write packet 140*b* that can be used in either of the conventional processes 800 or 850 to instruct a destination computing resource (e.g., a processing engine 120-*j*) of a computing system (e.g., 100) to write data(A) provided in the write packet. In this example, the write packet 140*b* has a header 142*b* and a payload 144*b*. The payload 144*b* includes data(A). The header 142*b* includes at least an opcode 146 and an address 148 at memory associated with the destination computing resource. Here, the opcode 146 has a value corresponding to a "write" operation and specifies an instruction for the destination computing resource to write data(A) at the address 148. The address 148 can be provided in any of the forms described above in connection with FIG. 5.

Referring again to FIG. 8A, note that, by performing the conventional process 800, it is insured that data(A), initially stored at an intermediary computing resource, in this case at the cluster memory, reaches a destination computing resource, in this case the other processing engine 120-*j*, no later than data(B), initially stored at an originator computing resource, in this case the processing engine 120-*i*, so that, e.g., the destination computing resource can process data(A) before processing data(B). Moreover, by performing the conventional process 850 described in connection with FIG. 8B, it is not guaranteed that data(A), initially stored at the intermediary computing resource, in this case at the cluster memory, reaches the destination computing resource, in this case the other processing engine 120-*j*, no later than data(B), initially stored at the originator computing resource, in this case the processing device 120-*i*, so that, e.g., the destination computing resource can process data(A) before processing data(B).

Processes that reduce a total number of packet transmissions between computing resources of a computing system (e.g., 100, 100A, 100B) and insure a desired delivery timing, or ordering, or both, at a destination computing resource of data read from memories associated with two or more computing resources of the computing system are described next.

Figure 9:
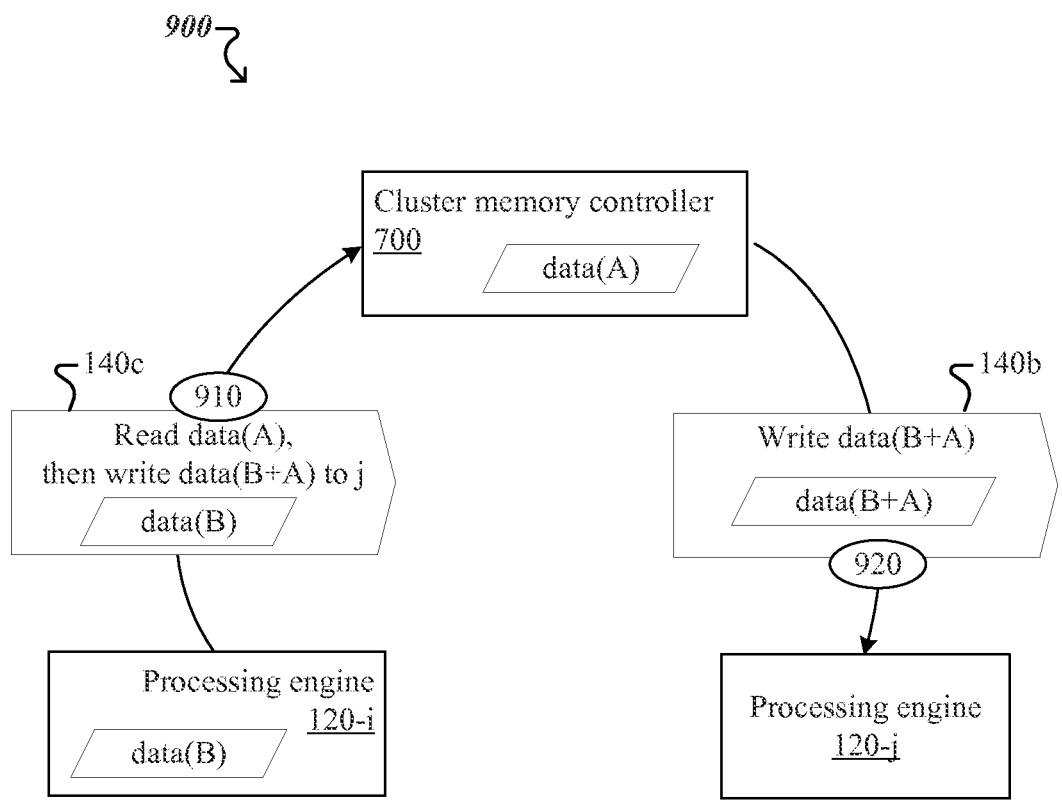
FIG. 9 shows aspects of an example of a process of writing first data, stored at memory associated with an originator computing resource, and second data, stored at memory associated with an intermediary computing resource, to a memory associated with a destination computing resource, where an appended-read packet is used to perform the process.
Figure 10:
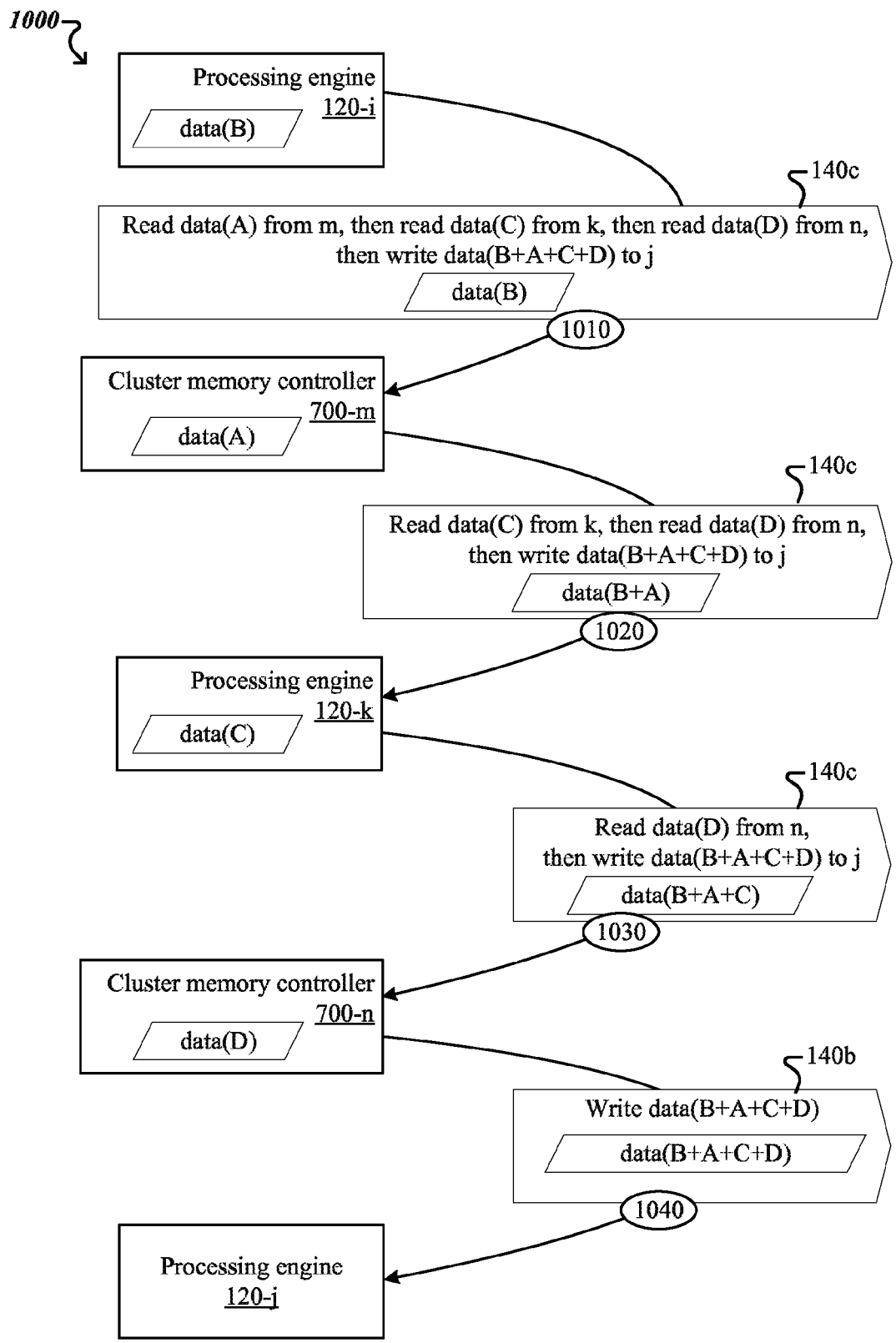
FIG. 10 shows aspects of an example of a process of writing first data item, stored at memory associated with an originator computing resource, and multiple data items, stored at memories associated with respective intermediary computing resources, to a memory associated with a destination computing resource, where a chain of appended-read packets is used to perform the process.

FIG. 9 shows aspects of an example of a process 900 of writing first data, stored in a memory associated with an originator computing resource, and second data, stored in memory associated with an intermediary computing resource, to a memory associated with a destination computing resource, where an appended-read packet 140*c* is used to perform the process 900. FIG. 10 shows aspects of an example of a process 1000 of writing first data item, stored in a memory associated with an originator computing resource, and multiple data items, stored in memories associated with respective intermediary computing resources, to a memory associated with a destination computing resource, where a chain of appended-read packets 140*c* is used to perform the process 1000. In some implementations of the processes 900 and 1000, the originator computing resource, the one or more intermediary computing resources and the destination computing resource are part of a computing system like the computing system 100 described above in connection with FIG. 1A, the computing system 100A described above in connection with FIG. 2A, or the computing system 100B described above in connection with FIG. 2B. Here, the computing resources involved in the processes 900 and 1000 can be one or more of a device controller 106, cluster controller 116, AIP 114, super cluster controller 132, processing engine 120, memory controller 700 of cluster memory 118, or other computing resources of the computing system 100, 100A or 100B.

In the example illustrated in FIG. 9, the originator computing resource is a processing engine 120-*i*, the intermediary computing resource is a cluster memory controller 700 and the destination computing resource is another processing engine 120-*j*. Here, a cluster memory (e.g., 118) controlled by the cluster memory controller 700 may be part of the same cluster (e.g., 110) to which one or both of the processing engines 120-*i* and 120-*j* belong, or may be part of a different cluster of the same processing device (e.g., 102) or of a different processing device. Moreover, the processing engines 120-*i* and 120-*j* may be part of the same cluster, or may be part of different clusters of the same processing device or of a different processing device.

Here, the processing engine 120-*i* accesses data(B) in the memory associated with the processing engine 120-*i*. Additionally, at 910, the processing engine 120-*i* transmits an appended-read packet 140*c*, that includes data(B), to the cluster memory controller 700. The appended-read packet 140*c* also includes data specifying instructions for to the cluster memory controller 700 to read data(A) from the cluster memory, and then, to send both data(A) and data(B) (denoted as appended data(B+A)) to the other processing engine 120-*j*. As the sequence of operations of receiving data(B), reading data(A) and forwarding appended data(B+A) is referred to as an "appended-read" operation, the instructions specified in the appended-read packet 140*c* can be encoded in an opcode with a value corresponding to an appended-read operation. In response to receiving the appended-read packet 140*c*, the cluster memory controller 700 accesses data(A) in the cluster memory. Then, at 920, the cluster memory controller 700 transmits a write packet 140*b*, that includes appended data(B+A), to the other processing engine 120-*j*. The write packet 140*b* also includes data specifying an instruction for the other processing engine 120-*j* to write appended data(B+A) to the memory associated with the other processing engine 120-*j*. Upon receipt of the write packet 140*b*, the other processing engine 120-*j* writes appended data(B+A) to the memory associated with the other processing engine 120-*j*, as instructed.

In the example illustrated in FIG. 10, the originator computing resource is a processing engine 120-*i*, the intermediary computing resources are cluster memory controllers 700-*m* and 700-*n* and another processing engine 120-*k*, and the destination computing resource is yet another processing engine 120-*j*. Here, cluster memories (e.g., 118) controlled by the respective cluster memory controllers 700-*m* and 700-*n* may be part of the same cluster (e.g., 110) to which one, two or all three of the processing engines 120-*i*, 120-*k* and 120-*j* belong, or may be part of a different cluster of the same processing device (e.g., 102) or of a different processing device. Moreover, the processing engines 120-*i*, 120-*k* and 120-*j* may be part of the same cluster, or may be part of different clusters of the same processing device or of a different processing device.

Here, the processing engine 120-*i* accesses data(B) in the memory associated with the processing engine 120-*i*. Additionally, at 1010, the processing engine 120-*i* transmits a first appended-read packet 140*c*, that includes data(B), to the cluster memory controller 700-*m*. The first appended-read packet 140*c* also includes data specifying first instructions for the cluster memory controller 700-*m* to read data(A) from its cluster memory, and then, to send both data(A) and data(B) (denoted as appended data(B+A)) to the other processing engine 120-*k*; second instructions for the other processing engine 120-*k* to read data(C) from memory associated with the other processing engine 120-*k*, and then, to send both appended data(B+A) and data(C) (denoted as appended data(B+A+C)) to the other cluster memory controller 700-*n*; and third instructions for the other cluster memory controller 700-*n* to read data(D) from its cluster memory, and then, to send both appended data(B+A+C) and data(D) (denoted as appended data(B+A+C+D)) to the yet other processing engine 120-*j*. Here, the first instructions correspond to a first appended-read operation, the second instructions correspond to a second appended-read operation and the third instructions correspond to a third appended-read operation. In this manner, the sequence of first appended-read operation, second appended-read operation and third appended-read operation is referred to as a "chained appended-read" operation.

In response to receiving the first appended-read packet 140*c*, the cluster memory controller 700-*m* accesses data(A) in its cluster memory. Then, at 1020, the cluster memory controller 700-*m* transmits a second appended-read packet 140*c*, that includes appended data(B+A), to the other processing engine 120-*k*. The second appended-read packet 140*c* also includes data specifying the second instructions for the other processing engine 120-*k* to read data(C) from memory associated with the other processing engine 120-*k*, and then, to send appended data(B+A+C) to the other cluster memory controller 700-*n*; and the third instructions for the other cluster memory controller 700-*n* to read data(D) from its cluster memory, and then, to send appended data(B+A+C+D) to the yet other processing engine 120-*j*.

In response to receiving the second appended-read packet 140*c*, the other processing engine 120-*k* accesses data(C) in the memory associated with the other processing engine 120-*k*. Then, at 1030, the other processing engine 120-*k* transmits a third appended-read packet 140*c*, that includes appended data(B+A+C), to the other cluster memory controller 700-*n*. The third appended-read packet 140*c* also includes data specifying the third instructions for the other cluster memory controller 700-*n* to read data(D) from its cluster memory, and then, to send appended data(B+A+C+D) to the yet other processing engine 120-*j*.

In response to receiving the third appended-read packet 140*c*, the other cluster memory controller 700-*n* accesses data(D) in its cluster memory. Then, at 1040, the other cluster memory controller 700-*n* transmits a write packet 140*b*, that includes appended data(B+A+C+D), to the yet other processing engine 120-*j*. The write packet 140*b* also includes data specifying an instruction for the other processing engine 120-*j* to write appended data(B+A+C+D) to the memory associated with the yet other processing engine 120-*j*. Upon receipt of the write packet 140*b*, the yet other processing engine 120-*j* writes appended data(B+A+C+D) to the memory associated with the yet other processing engine 120-*j*, as instructed.

Figure 11A:
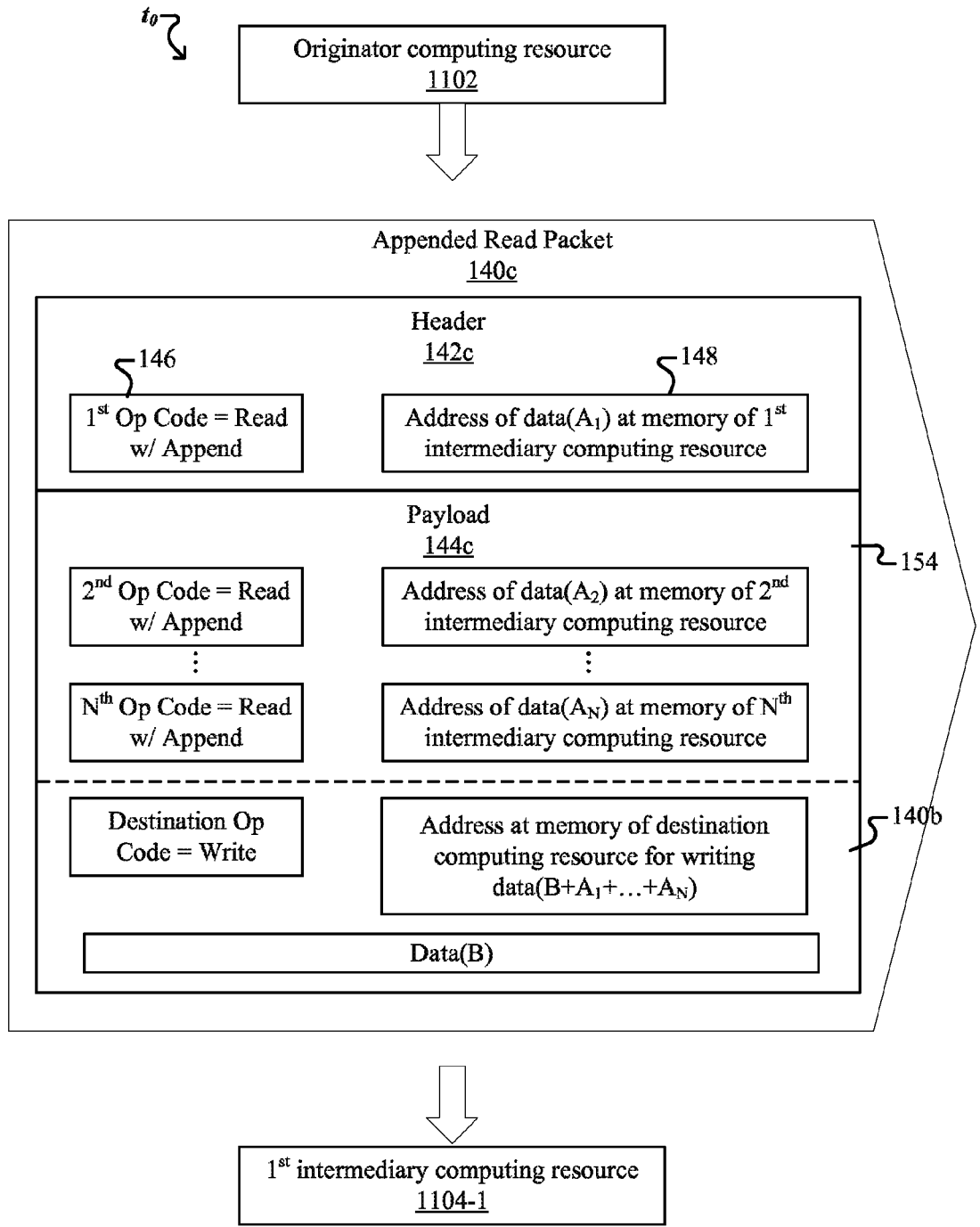
FIGS. 11A-11C show aspects of appended-read packets.
Figure 11B:
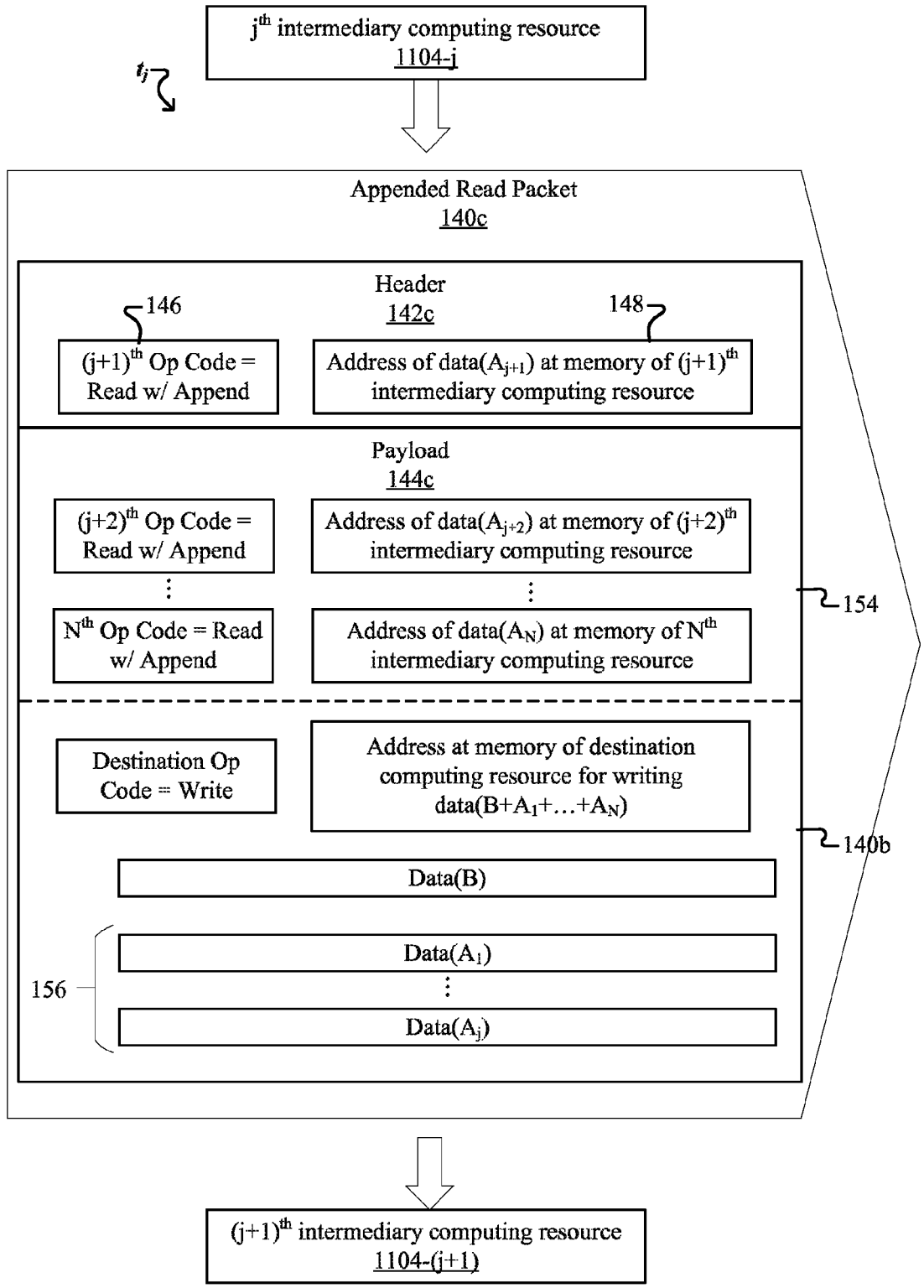

FIGS. 11A and 11B show aspects of appended-read packets 140*c* that can be used in either of the processes 900 or 1000 to address an intermediary computing resource (e.g., a cluster memory controller 700 or another processing engine 120-*k*) of a computing system (e.g., 100).

FIG. 11A shows that, at to, which corresponds to 910 of process 900 or 1010 of process 1000, an originator computing resource 1102 transmits a $1^{st}$ appended-read packet 140*c* to a $1^{st}$ intermediary computing resource 1104-1. In this example, the $1^{st}$ appended-read packet 140*c* has a header 142*c* and a payload 142*c*.

This instance of the header 142*c* includes at least an opcode 146 and an address 148 of data($A_1$) at memory associated with the $1^{st}$ intermediary computing resource 1104-1 to which the first appended-read packet 140*c* is addressed. The memory address 148 can be provided in any of the forms described above in connection with FIG. 5. In this example, the opcode 146 has a value corresponding to a $1^{st}$ appended-read operation and specifies instructions for the $1^{st}$ intermediary computing resource 1104-1 to read data(A1) from the memory address 148, then to append data(A1) to data included in the payload 142*c* and to forward the appended data to the $2^{nd}$ intermediary computing resource.

Here, the payload 144*c* includes an instructions portion 154 and a write packet 140*b*. The instructions portion 154 includes a $2^{nd}$ opcode corresponding to a $2^{nd}$ appended-read operation to be performed by the $2^{nd}$ intermediary computing resource and an address of data($A_2$) at memory associated with the $2^{nd}$ intermediary computing resource; and so on; and $N^{th}$ (and last) opcode corresponding to $N^{th}$ (and last) appended-read operation to be performed by the $N^{th}$ (and last) intermediary computing resource and an address of data($A_N$) at memory associated with the $N^{th}$ intermediary computing resource. The write packet 140*b* included in the payload 144*c* is to be transmitted by the $N^{th}$ intermediary computing device to a destination computing device. A $1^{st}$ instance of the write packet 140*b* included in the payload 144*c* of the $1^{st}$ appended-read packet 140*c* includes: data(B) provided by the originator computing resource 1102; a destination opcode corresponding to a write operation to be performed by the destination computing resource; and an address of memory associated with the destination computing resource where appended data(B+$A_1$+ . . . +$A_N$) is to be written by the destination computing resource.

Upon receipt of the $1^{st}$ appended-read packet 140*c* from the originator computing resource 1102, the $1^{st}$ intermediary computing resource 1104-1 accesses the memory address 148 and reads data($A_1$). Moreover, the $1^{st}$ intermediary computing resource 1104-1 generates a $2^{nd}$ appended-read packet 104*c* in the following manner. The $1^{st}$ intermediary computing resource 1104-1 forms a $2^{nd}$ instance of the write packet 140*b* included in the payload 144*c* by appending data($A_1$) to data(B). In this manner, the $2^{nd}$ instance of the write packet 140*b* included in the $2^{nd}$ appended-read packet 140*c* is greater than the $1^{st}$ instance of the write packet 140*b* included in the $1^{st}$ instance of the appended-read packet 140*c*. Further, the $1^{st}$ intermediary computing resource 1104-1 transfers the $2^{nd}$ opcode corresponding to the $2^{nd}$ appended-read operation to be performed by the $2^{nd}$ intermediary computing resource and the address of data($A_2$) at the memory associated with the $2^{nd}$ intermediary computing resource from the instructions portion 154 of the payload 144*c* to the header 142*c* to update respective opcode 146 and memory address 148. As such, the instructions portion 154 of the $2^{nd}$ appended-read packet 140*c* is smaller than the instructions portion 154 of the $1^{st}$ instance of the appended-read packet 140*c*. Once the $2^{nd}$ appended-read packet 140*c* has been generated in this manner, the $1^{st}$ intermediary computing device 1104-1 transmits the $2^{nd}$ appended-read packet 140*c* to the $2^{nd}$ intermediary computing device.

FIG. 11B show that, at $t_j$, which corresponds to 1020 or 1030 of process 1000, a $j^{th}$ intermediary computing resource 1104-*j* transmits a $(j+1)^{th}$ appended-read packet 140*c* to a $(j+1)^{th}$ intermediary computing resource 1104-(*j*+1).

A header 142*c* of the $(j+1)^{th}$ appended-read packet 140*c* includes an address 148 of data($A_{j+1}$) at memory associated with the $(j+1)^{th}$ intermediary computing resource 1104-(*j*+1) to which the $(j+1)^{th}$ appended-read packet 140*c* is addressed. In this example, the opcode 146 has a value corresponding to a $(j+1)^{th}$ appended-read operation and specifies instructions for the $(j+1)^{th}$ intermediary computing resource 1104-(*j*+1) to read data($A_{j+1}$) from the memory address 148, then to append data($A_{j+1}$) to data included in a payload 142*c* of the $(j+1)^{th}$ appended-read packet 140*c* and to forward the appended data to the $(j+2)^{th}$ intermediary computing resource.

Here, the instructions portion 154 includes a $(j+2)^{th}$ opcode corresponding to a $(j+2)^{th}$ appended-read operation to be performed by the $(j+2)^{th}$ intermediary computing resource and an address of data($A_{j+2}$) at memory associated with the $(j+2)^{th}$ intermediary computing resource; and so on; and $N^{th}$ opcode corresponding to $N^{th}$ appended-read operation to be performed by the $N^{th}$ intermediary computing resource and an address of data($A_N$) at memory associated with the $N^{th}$ intermediary computing resource. A $(j+1)^{th}$ instance of the write packet 140*b* of the $(j+1)^{th}$ appended-read packet 140*c* includes: data(B) provided by the originator computing resource 1102, read data 156—which includes data($A_1$) appended by the $1^{st}$ intermediary computing resource, and so on, and data(A) appended by the $j^{th}$ intermediary computing resource; the write opcode; and the address of memory associated with the destination computing resource for writing appended data(B+$A_1$+ . . . +$A_N$).

Upon receipt of the $(j+1)^{th}$ appended-read packet 140*c* from the $j^{th}$ intermediary computing resource 1104-*j*, the $(j+1)^{th}$ intermediary computing resource 1104-(*j*+1) accesses the memory address 148 and reads data($A_{j+1}$). Moreover, the $(j+1)^{th}$ intermediary computing resource 1104-(*j*+1) generates a $(j+2)^{th}$ appended-read packet in the following manner. The $(j+1)^{th}$ intermediary computing resource 1104-(*j*+1) forms a $(j+2)^{th}$ instance of the write packet 140*b* included in the payload 144*c* by appending data($A_{j+1}$) to data(B) and read data 156: data($A_1$), data($A_j$). In this manner, the $(j+2)^{th}$ instance of the write packet 140*b* included in the $(j+2)^{th}$ appended-read packet 140*c* is greater than the $(j+1)^{th}$ instance of the write packet 140*b* included in the $(j+1)^{th}$ instance of the appended-read packet 140*c*. Further, the $(j+1)^{th}$ intermediary computing resource 1104-(*j*+1) transfers the $(j+2)^{th}$ opcode corresponding to the $(j+2)^{th}$ appended-read operation to be performed by the $(j+2)^{th}$ intermediary computing resource and the address of data ($A_{j+2}$) at the memory associated with the $(j+2)^{th}$ intermediary computing resource from the instructions portion 154 of the payload 144*c* to the header 142*c* to update respective opcode 146 and memory address 148. As such, the instructions portion 154 of the $(j+2)^{th}$ appended-read packet 140*c* is smaller than the instructions portion 154 of the $(j+1)^{th}$ instance of the appended-read packet 140*c*. Once the $(j+2)^{th}$ appended-read packet 140c has been generated in this manner, the (j+1)th intermediary computing device 1104-(j+1) transmits the (j+2)th appended-read packet 140c to the (j+2)th intermediary computing device.

Figure 11C:
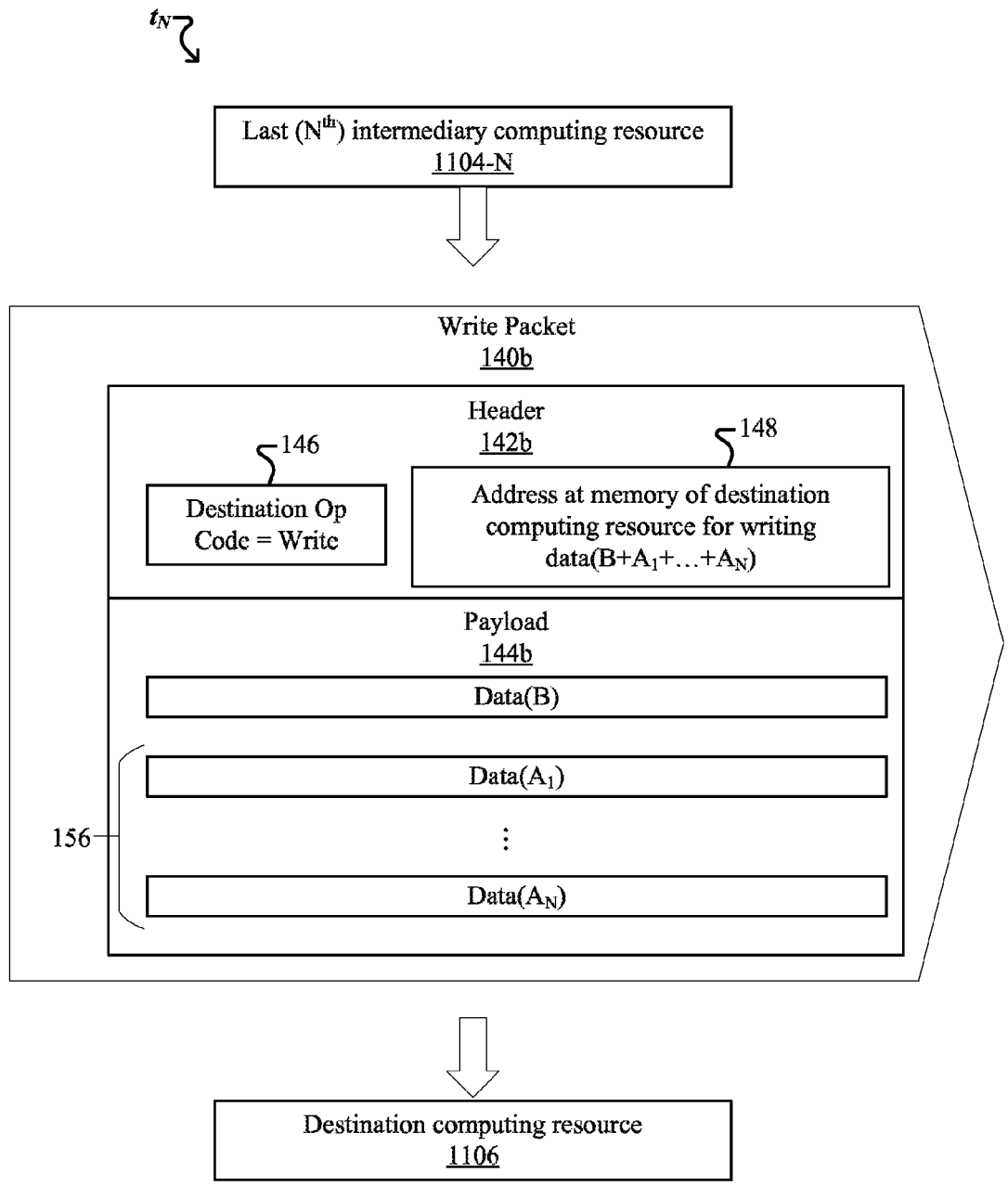

FIG. 11C shows that, at $t_N$, which corresponds to 920 of process 900 or 1040 of process 1000, the last (Nth) intermediary computing resource 1104-N transmits to the destination computing resource 1106 the write packet 140b. Note that the write packet 140b has been included in the payload 144c of the 1st appended-read packet 140c transmitted by the originator computing resource 1102, and then it has been relayed from intermediary computing device 1104-j to subsequent intermediary computing device 1104-(j+1) until it reached the last intermediary computing resource 1104-N, where j=1 . . . N, and N≥1.

Upon receipt of the Nth appended-read packet 140c from the (N−1)th intermediary computing resource 1104-j, the last (Nth) intermediary computing resource 1104-N accesses the memory address 148 and reads data($A_N$). Moreover, the last (Nth) intermediary computing resource 1104-N updates a last instance of the write packet 140b. In a payload 142b of the write packet 140b, the last (Nth) intermediary computing resource 1104-N appends data($A_N$) to data(B) and read data 156: data(A1), . . . , data($A_{N-1}$). In this manner, the last instance of write packet 140b includes appended data(B+$A_1$+ . . . +$A_N$) to be delivered to the destination computing resource 1106. Additionally, in a header 142c of the last instance of write packet 140c includes the destination opcode 146 corresponding to the write operation to be performed by the destination computing resource 1106, and the address 148 of memory associated with the destination computing resource 1106 where appended data(B+$A_1$+ . . . +$A_N$) is to be written by the destination computing resource 1106.

Upon receipt of the write packet 140c from the last (Nth) intermediary computing resource 1104-N, the destination computing resource 1106 writes appended data (B+$A_1$+ . . . +$A_N$) to the memory address 148, as instructed.

In some implementations, an order in which data read from multiple intermediary computing resources is to be aggregated prior to transmission to a destination computing resource 1106 can be specified in the instructions portion 154 of the appended read packet 140c. In the example illustrated in FIGS. 11A-11C, data(B), data($A_1$), data($A_2$), . . . , data($A_N$) is to be aggregated in this order prior to transmission to the destination computing resource 1106. Here, read data($A_1$) is entered in the write packet 140b after data(B), read data($A_2$) is entered in the write packet after data($A_1$) and so on. This is an example of performing chained read-with-append operations (or appended-read operations) as specified by a sequence of read with append opcodes included in the instructions section 154 of the appended read packet 140c. As another example (not illustrated in FIGS. 11A-11C), data($A_N$), . . . , data($A_2$), data($A_1$) and data(B) is to be aggregated in this order prior to transmission to the destination computing resource 1106. Here, read data($A_1$) is entered in the write packet 140b before data(B), read data($A_2$) is entered in the write packet before data($A_1$) and so on. This is an example of performing chained read-with-prepend operations (or prepended-read operations) as specified by a sequence of read with prepend opcodes included in the instructions section 154 of the appended read packet 140c. In this manner, the data aggregated in a desired order can be streamed over a serial path to the destination computing resource 1106. For instance, the most significant longword (or the least significant longword) may be beneficially transmitted first, in a big endian/little endian streaming sense.

Any other data pattern can be aggregated in the write packet 140b by performing an appropriate combination of chained of read-with-append operations and read-with-prepend operations in accordance with a sequence of read with append opcodes and read with prepend opcodes included in the instructions section 154 of the appended read packet 140c. In yet another example (not illustrated in FIGS. 11A-11C), data($A_N$), data($A_{N-2}$), . . . , data($A_2$), data(B), data($A_1$), data($A_3$), . . . , data($A_{N-3}$), data($A_{N-1}$) is to be aggregated in this order prior to transmission to the destination computing resource 1106. Here, read data($A_1$) is entered in the write packet 140b after data(B), read data($A_2$) is entered in the write packet 140b before data(B), read data($A_3$) is entered in the write packet after data($A_1$), read data($A_4$) is entered in the write packet before data($A_2$) and so on, such that data read from odd intermediary computing resources is appended to previously read data, and data read from even intermediary computing resources is prepended to previously read data. This is an example of performing chained appended-read operations alternating with prepended-read operations as specified by a sequence of read with append opcodes alternating with read with prepend opcodes included in the instructions section 154 of the appended read packet 140c.

In the above description, numerous specific details have been set forth in order to provide a thorough understanding of the disclosed technologies. In other instances, well known structures, interfaces, and processes have not been shown in detail in order to avoid unnecessarily obscuring the disclosed technologies. However, it will be apparent to one of ordinary skill in the art that those specific details disclosed herein need not be used to practice the disclosed technologies and do not represent a limitation on the scope of the disclosed technologies, except as recited in the claims. It is intended that no part of this specification be construed to effect a disavowal of any part of the full scope of the disclosed technologies. Although certain embodiments of the present disclosure have been described, these embodiments likewise are not intended to limit the full scope of the disclosed technologies.

While specific embodiments and applications of the disclosed technologies have been illustrated and described, it is to be understood that the disclosed technologies are not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the disclosed technologies disclosed herein without departing from the spirit and scope of the disclosed technologies. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of hardware processors, e.g., microprocessors, microcontrollers, field programmable gate arrays (FPGAs), application specific integrated circuits (ASICs), and/or System on a Chip (SoC)—but such implementation decisions should not be interpreted as causing a departure from the scope of the disclosed technologies.

The steps of a method or algorithm described in connection with the embodiments disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the disclosed technologies. In other words, unless a specific order of steps or actions is required for proper operation of the embodiment, the order and/or use of specific steps and/or actions may be modified without departing from the scope of the disclosed technologies.

What is claimed is:

1. A method comprising:
   (a) receiving a first packet, at an intermediary computing resource from a first computing resource, wherein the first computing resource and the intermediary computing resource are among a plurality of computing resources of a computing system, the first packet comprising:
      (i) first data that is, at least in part, retrieved from memory associated with the first computing resource,
      (ii) an address corresponding to memory associated with the intermediary computing resource, and data specifying an instruction to read second data from the address corresponding to memory associated with the intermediary computing resource, and
      (iii) an address of a destination computing resource from among the plurality of computing resources of the computing system, and data specifying an instruction to write the first data and the second data to memory associated with the destination computing resource;
   (b) reading, by the intermediary computing resource, the second data from the address corresponding to memory associated with the intermediary computing resource; and
   (c) transmitting a second packet, by the intermediary computing resource to a second computing resource from among the plurality of computing resources of the computing system, the second packet comprising:
      (i) the first data and the second data, and
      (ii) the address of the destination computing resource, and the data specifying the write instruction.

2. The method of claim 1, wherein the second packet does not include the address corresponding to memory associated with the intermediary computing resource.

3. The method of claim 1, wherein the second computing resource is the destination computing resource.

4. The method of claim 3, wherein the first packet and the second packet each include an address corresponding to memory associated with the destination computing resource to which the first data and the second data are to be written.

5. The method of claim 1, wherein
   the second computing resource is a second intermediary computing resource from among the plurality of computing resources of the computing system, and
   each of the first packet and the second packet further comprises
      an address corresponding to memory associated with the second intermediary computing resource, and data specifying an instruction to read third data from the address corresponding to memory associated with the second intermediary computing resource, and
      data specifying an instruction to write the third data to the memory associated with the destination computing resource.

6. The method of claim 5, wherein the first packet and the second packet each include an address corresponding to the memory associated with the destination computing resource to which the third data is to be written.

7. The method of claim 1, wherein
   the first computing resource is an originator computing resource, and
   all the first data associated with the first computing resource is retrieved from the memory associated with the first computing resource.

8. The method of claim 1, wherein
   the first computing resource is another intermediary computing resource, and
   the first data associated with the first computing resource is data aggregated by the first computing resource, at least in part, from data received from an originator computing resource with data from the memory associated with the first computing resource.

9. The method of claim 1, wherein the plurality of computing resources of the computing system comprises one or more controllers of one or more processing devices included in the computing system, a plurality of processing engines of the one or more processing devices, and one or more memory controllers of cluster memory of the one or more processing devices.

10. The method of claim 1, further comprising ordering, by the intermediary computing resource in a payload of the second packet, the second data—read by the intermediary computing resource—after the first data—received from the first computing resource.

11. The method of claim 1, further comprising ordering, by the intermediary computing resource in a payload of the second packet, the second data—read by the intermediary computing resource—before the first data—received from the first computing resource.

12. A computing apparatus comprising:
    one or more hardware processors; and
    non-transitory computer-readable medium encoding instructions that, when executed by the one or more hardware processors, cause the computing apparatus to perform operations comprising:

(a) receive a first packet from a first computing apparatus communicatively coupled with the computing apparatus, the first packet comprising:
  (i) first data that is, at least in part, retrieved from memory associated with the first computing apparatus,
  (ii) an address corresponding to memory associated with the computing apparatus, and data specifying an instruction to read second data from the address corresponding to memory associated with the computing apparatus, and
  (iii) an address of a destination computing apparatus communicatively coupled with the computing apparatus, and data specifying an instruction to write the first data and the second data to memory associated with the destination computing apparatus;
(b) read the second data from the address corresponding to memory associated with the computing apparatus; and
(c) transmit a second packet, to a second computing apparatus communicatively coupled with the computing apparatus, the second packet comprising:
  (i) the first data and the second data, and
  (ii) the address of the destination computing apparatus, and the data specifying the write instruction.

13. The computing apparatus of claim 12, wherein the second packet does not include the address corresponding to memory associated with the computing apparatus.

14. The computing apparatus of claim 12, wherein the second computing apparatus is the destination computing apparatus.

15. The computing apparatus of claim 14, wherein the first packet and the second packet each include an address corresponding to memory associated with the destination computing apparatus to which the first data and the second data are to be written.

16. The computing apparatus of claim 14, wherein each of the first packet and the second packet further comprises
  an address corresponding to memory associated with the second computing apparatus, and data specifying an instruction to read third data from the address corresponding to memory associated with the second computing apparatus, and
  data specifying an instruction to write the third data to the memory associated with the destination computing apparatus.

17. The computing apparatus of claim 16, wherein the first packet and the second packet each include an address corresponding to the memory associated with the destination computing apparatus to which the third data is to be written.

18. The computing apparatus of claim 12, wherein
  the first computing apparatus is an originator computing apparatus, and
  all the first data associated with the first computing apparatus is retrieved from the memory associated with the first computing apparatus.

19. The computing apparatus of claim 12, wherein the first data associated with the first computing apparatus is data aggregated by the first computing apparatus, at least in part, from data received from an originator computing apparatus with data from the memory associated with the first computing apparatus.

20. The computing apparatus of claim 12 is configured either as a controller of a processing device included in a computing system, a processing engine of the processing device, or a memory controller of cluster memory of the processing device.

21. A computing system comprising:
a plurality of computing resources; and
memory associated with respective ones of the computing resources,
wherein an intermediary computing resource of the plurality of computing resources is communicatively coupled with each of a first computing resource and a second computing resource of the plurality of computing resources, the intermediary computing resource being configured to
(a) receive a first packet from the first computing resource, the first packet comprising
  (i) first data that is, at least in part, retrieved from memory associated with the first computing resource,
  (ii) an address corresponding to memory associated with the intermediary computing resource, and data specifying an instruction to read second data from the address corresponding to memory associated with the intermediary computing resource, and
  (iii) an address of a destination computing resource from among the plurality of computing resources, and data specifying an instruction to write the first data and the second data to memory associated with the destination computing resource;
(b) read the second data from the address corresponding to memory associated with the intermediary computing resource; and
(c) transmit a second packet to the second computing resource, the second packet comprising
  (i) the first data and the second data, and
  (ii) the address of the destination computing resource, and the data specifying the write instruction.

22. The computing system of claim 21, wherein the second packet does not include the address corresponding to memory associated with the intermediary computing resource.

23. The computing system of claim 21, wherein the second computing resource is the destination computing resource.

24. The computing system of claim 23, wherein the first packet and the second packet each include an address corresponding to memory associated with the destination computing resource to which the first data and the second data are to be written.

25. The computing system of claim 21, wherein
  the second computing resource is a second intermediary computing resource, and
  each of the first packet and the second packet further comprises
    an address corresponding to memory associated with the second intermediary computing resource, and data specifying an instruction to read third data from the address corresponding to memory associated with the second intermediary computing resource, and
    data specifying an instruction to write the third data to the memory associated with the destination computing resource.

26. The computing system of claim 25, wherein the first packet and the second packet each include an address corresponding to the memory associated with the destination computing resource to which the third data is to be written.

27. The computing system of claim 21, wherein
  the first computing resource is an originator computing resource, and all the first data associated with the first computing resource is retrieved from the memory associated with the first computing resource.

28. The computing system of claim 21, wherein the first computing resource is another intermediary computing resource that is communicatively coupled with an originator computing resource from among the plurality of computing resources, and the first data associated with the first computing resource is data aggregated by the first computing resource, at least in part, from data received from the originator computing resource with data from the memory associated with the first computing resource.

29. The computing system of claim 21, wherein the plurality of computing resources of the computing system comprises one or more controllers of one or more processing devices included in the computing system, a plurality of processing engines of the one or more processing devices, and one or more memory controllers of cluster memory of the one or more processing devices.

30. The computing system of claim 29, wherein the first computing resource is a first processing engine of the plurality of processing engines, the intermediary computing resource is one of the one or more memory controllers, and the destination computing resource is a second processing engine of the plurality of processing engines.

31. The computing system of claim 29, wherein the first computing resource is a first processing engine of the plurality of processing engines, the intermediary computing resource is a second processing engine of the plurality of processing engines, and the second computing resource is a third processing engine of the plurality of processing engines.

32. The computing system of claim 29, wherein the first computing resource is a processing engine of the plurality of processing engines, the intermediary computing resource is a first one of the one or more memory controllers, and the destination computing resource is a second one of the one or more memory controllers.

33. The computing system of claim 29, wherein at least one processing device from among the one or more processing devices is implemented as a system on a chip (SoC).

34. The computing system of claim 29, wherein at least one computing resource of the plurality of computing resources is implemented as a microprocessor, a microcontroller, a field programmable gate array (FPGA) or an application specific integrated circuit (ASIC).

\* \* \* \* \*

UNITED STATES PATENT AND TRADEMARK OFFICE
CERTIFICATE OF CORRECTION

PATENT NO. : 9,686,191 B2  
APPLICATION NO. : 14/832654  
DATED : June 20, 2017  
INVENTOR(S) : Andy White, Doug B. Meyer and Jerry Coffin Page 1 of 1

It is certified that error appears in the above-identified patent and that said Letters Patent is hereby corrected as shown below:

On the Title Page

Column 1, (73) Assignee, please delete "Incorporation" and insert -- Incorporated -- therefore.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*